(12) United States Patent
Nakajima et al.

(10) Patent No.: US 8,172,144 B2
(45) Date of Patent: May 8, 2012

(54) MEDIA STORING CODE DETECTING PROGRAM, CODE DETECTING METHOD, AND IMAGE FORMING APPARATUS

(75) Inventors: Takeshi Nakajima, Hino (JP); Koichi Kitamoto, Machida (JP); Hirohiko Yamazaki, Machida (JP); Tsuyoshi Yoneyama, Hachioji (JP); Hiroshi Seguchi, Machida (JP)

(73) Assignee: Konica Minolta Business Technologies, Inc. (JP)

(*) Notice: Subject to any disclaimer, the term of this patent is extended or adjusted under 35 U.S.C. 154(b) by 933 days.

(21) Appl. No.: 12/114,629

(22) Filed: May 2, 2008

(65) Prior Publication Data

US 2008/0283609 A1    Nov. 20, 2008

(30) Foreign Application Priority Data

May 14, 2007  (JP) .................. 2007-128226
Jun. 4, 2007   (JP) .................. 2007-147932

(51) Int. Cl.
*G06K 7/10*    (2006.01)
(52) U.S. Cl. .......... 235/462.07; 235/462.01; 235/462.09
(58) Field of Classification Search ............ 235/462.08, 235/462.07, 462.01, 462.09
See application file for complete search history.

(56) References Cited

U.S. PATENT DOCUMENTS

| | | | | |
|---|---|---|---|---|
| 5,134,272 A | * | 7/1992 | Tsuchiya et al. | 235/462.08 |
| 5,512,739 A | * | 4/1996 | Chandler et al. | 235/462.09 |
| 5,698,833 A | * | 12/1997 | Skinger | 235/462.09 |
| 5,719,384 A | * | 2/1998 | Ju et al. | 235/462.1 |
| 6,123,262 A | * | 9/2000 | Shellhammer | 235/462.09 |
| 6,201,901 B1 | * | 3/2001 | Zhou et al. | 382/306 |

FOREIGN PATENT DOCUMENTS

| | | |
|---|---|---|
| JP | 06-150045 | 5/1994 |
| JP | 08-054347 | 2/1996 |
| JP | 2003-099407 | 4/2003 |
| JP | 2007-122595 | 5/2007 |

OTHER PUBLICATIONS

JPO Notice of Rejection for Appl. No. 2007-128226, mailed May 7, 2009, 2 pgs.
Translation of JPO Notice of Rejection for Appl. No. 2007-128226, mailed May 7, 2009, 2 pgs.
JPO Office Action for Appl. No. 2007-147932, mailed May 20, 2009, 2 pgs.
Translation of JPO Office Action for Appl. No. 2007-147932, mailed May 20, 2009, 2 pgs.

* cited by examiner

*Primary Examiner* — Ahshik Kim
(74) *Attorney, Agent, or Firm* — Squire Sanders (US) LLP

(57) ABSTRACT

A medium storing a program to make a computer to function as a code detecting device, the code detecting device comprises a base line specifying section to extract edges from a scan image obtained by a process of scanning a printed matter in which at least a one-dimensional bar code or a two dimensional code are printed, to extract straight lines from the extracted edges, and to specify the longest straight line as a base line among the extracted straight lines; and a code detecting section to perform a pattern matching for the scan image based on the base line and to detect the one-dimensional bar code or the two dimensional code.

24 Claims, 14 Drawing Sheets

CANDIDATE REGION

MEDIA STORING CODE DETECTING PROGRAM, CODE DETECTING METHOD, AND IMAGE FORMING APPARATUS

This application is based on Japanese Patent Application No. 2007-128226 filed on May 14, 2007, and Japanese Patent Application No. 2007-147932 filed on Jun. 4, 2007, in Japanese Patent Office, the entire content of which is hereby incorporated by reference.

BACKGROUND OF THE INVENTION

The present invention relates to a program, a method of detecting codes such as a one-dimensional bar code and a two dimensional code and an image forming apparatus equipped with a function to detect cods.

Many printed matters such as a magazine and a free paper in recent years are printed with two dimensional codes such as QR Code (registered trademark) in which URL (Uniform Resource Locator) information of shops and so on is recorded, and a user can receive a service to provide a discount ticket etc. by reading a two dimensional code with a photographing function of a mobile telephone and by accessing URL recorded on the two dimensional code with a network connecting function. However, for example, among mobile telephones in which functions are simplified in order to make operations easy and mobile telephones for a business use, there are some types of mobile telephones in which the photographing function is not installed. With these mobile telephones, a user using such a mobile cannot receive the above-mentioned service.

On the other hand, image forming apparatus equipped with a function capable of connecting with communication networks such as Internet become widely used. Since such image forming apparatus is installed in various places, a user using a mobile telephone not equipped with a photographing function can receive the above-mentioned service by scanning a free paper etc. with the image forming apparatus installed in a convenience store etc. and by extracting a two dimensional code (for example, refer to Japanese Patent Unexamined Publication No. 2004-227247). In this case, in order to extract the two dimensional code certainly, it is necessary to perform a suitable image processing by the image forming apparatus. As an example of such an image processing, for example, Japanese Patent Unexamined Publication No. 07-220081 discloses a technique with which image edges are extracted, two crossing straight lines are looked by Hough transform and least mean square approximation and a candidate region is determined.

Generally, as a method of extracting QR Code from a scan image, a method of looking for the "cut-out symbol" prepared in a corner of the QR Code by a pattern matching is used. However, since a region where QR Code is printed is not constant, pattern matching must be carried out to all the region of a scan image, and there is a problem that an image processing takes time.

When a scanning is conducted for a printed matter placed on a scanner, the printed matter may be set obliquely. Therefore, QR Code is not necessarily parallel or perpendicular to the image angle of a scan image. Accordingly, in order to extract the QR Code certainly, a pattern matching must be carried out at all angles and there is a problem that an image processing takes time more.

For such a problem, it may be considered to use the image processing method of the above-mentioned patent documents 1. However, in many cases, since image information, such as a photograph, is printed on a printed matter, such as a magazine and a free paper, a lot of edges exist in the image information. Therefore, a huge number of straight lines are extracted by the Hough transform, and, as a result, there is a problem that it is impossible to conduct analysis for the image information or an image processing takes huge time.

The present invention is conceived in view of the above-mentioned problem, and the first object of the present invention is to provide a code detecting program, a code detecting method, and an image forming apparatus which can detect simply and certainly a one-dimensional bar code or a two dimensional code from a printed matter, even in the case where a scanning is conducted obliquely to a printed matter in which text information and image information such as a photograph etc., are mixed.

Incidentally, when one code is printed on a printed matter, such as a magazine and a free paper, the code can be specified as a target of the processing by the image forming apparatus. However, usually, plural codes are printed on the above-mentioned printed matter, and, in such a case, it cannot be judged whether the image forming apparatus reads which code and conducts the processing.

Therefore, a user has to conduct a processes to fold a printed matter or a processes to hind an unnecessary code in order to make it possible for a scanner to read only a desired code. Accordingly, there are problems that works become complicated and a processing such as printing a discount ticket based on a code cannot be performed easily.

The present invention is also conceived in view of the above-mentioned problems, and the second object of the present invention is to provide a control program, a control method, and an image forming apparatus which can perform a processing by utilizing a desired code easily, even in the case where codes such as plural one-dimensional bar codes and two dimensional codes are printed on a printed matter.

SUMMARY OF THE INVENTION

The above first object can be attained by the program stored in a medium, and the method and the image forming apparatus described below based on one aspect of the present invention.

A program stored in a medium makes a computer to function as a code detecting device, the code detecting device comprises:

a base line specifying section to extract edges from a scan image obtained by a scanning on a printed matter in which at least a one-dimensional bar code or a two dimensional code are printed, to extract straight lines from the extracted edges, and to specify the longest straight line as a base line among the extracted straight lines; and a code detecting section to perform a pattern matching for the scan image based on the base line and to detect the one-dimensional bar code or the two dimensional code.

A method of detecting a one-dimensional bar code or a two dimensional code printed on a printed matter, comprising:

a step of scanning the printed matter and obtaining a scan image of the printed matter;

a step of extracting edges from the scan image;

a step of extracting straight lines from the extracted edges;

a step of specifying the longest straight line as a base line among the extracted straight lines; and a step of performing a pattern matching for the scan image based on the base line and detecting the one-dimensional bar code or the two dimensional code.

An image forming apparatus, comprises:

a scanner to scan a printed matter in which at least a one-dimensional bar code or a two dimensional code are printed, and to obtain a scan image of the printed matter;

a base line specifying section to extract edges from the scan image, to extract straight lines from the extracted edges, and to specify the longest straight line as a base line among the extracted straight lines; and a code detecting section to perform a pattern matching for the scan image based on the base line and to detect the one-dimensional bar code or the two dimensional code.

The above second object can be attained by the program stored in a medium, and the method and the image forming apparatus described below based on one aspect of the present invention.

A program stored in a medium makes a computer to function as a control device, the control device comprises:

a code detecting section to detect plural codes from a scan image obtained by a scanning on a printed matter;

a display and control section to display the plural codes on a display section to make it possible to select at least one of the plural codes, and an information obtaining section to read a selected code, and to obtain information recorded on the code, or information stored at URL recorded on the code.

A method of controlling a processing based a code printed on a printed matter; comprises:

an image obtaining step of scanning the printed matter and obtaining a scan image of the printed matter;

a code detecting step of detecting plural codes from the scan image;

a displaying step of displaying the plural codes on a display section to make it possible to select at least one of the plural codes;

an information obtaining step of reading a selected code, and obtaining information recorded on the code, or information stored at URL recorded on the code; and an outputting step of outputting the obtained information.

An image forming apparatus, comprises:

a scanner to scan a printed matter in which at least a one-dimensional bar code or a two dimensional code are printed, and to obtain a scan image of the printed matter;

a code detecting section to detect plural codes from the scan image;

a display and control section to display the plural codes on a display section to make it possible to select at least one of the plural codes; and an information obtaining section to read a selected code, and to obtain information recorded on the code, or information stored at URL recorded on the code.

DETAILED DESCRIPTION OF THE PREFERRED EMBODIMENT

Hereinafter, the first embodiment to attain the first object of the present invention will be explained. However, since this embodiment is one example, the present invention is not limited to this embodiment.

As described above, an image forming apparatus is used for reading codes such as a one-dimensional bar code and a two dimensional code printed on a printed matter, such as a magazine and a free paper. However, various kinds of information such as image information, text information and so on are printed on the above-mentioned printed matter in addition to codes. Moreover, the printed matter may be obliquely set to a scanner stand. Therefore, in the image forming apparatus, there is a problem that it is necessary to carry out a pattern matching in all directions to all the region of a scan image obtained from a printed matter by a scanning and as a result, an image processing takes time.

On the other hand, in consideration of a design, conspicuousness and so on, long straight lines such as a frame line showing a boundary and a dividing line are usually printed on a printed matter such as a magazine and a free paper, and a one-dimensional bar code, a two dimensional code and the like are printed in parallel and/or perpendicular to the straight line. Therefore, if a suitable image processing is performed to scanning data so as to detect a frame line, a dividing line, etc., it becomes possible to detect a code easily on the basis of the line.

Then, in the present embodiment, the following two methods are adopted such that a code can be detected from a printed matter simply and certainly. The first method comprises the steps of using Dyadic wavelet transform and Hough transform which are mentioned later; extracting edges by performing the Dyadic wavelet transform to a scan image; selecting edges having a high-frequency-wave intensity higher than a specified value from the extracted edges; extracting straight lines by performing the Hough transform to the selected edges; specifying a base line among the extracted straight lines; performing a pattern matching to the scan image in the specific direction to the base line, and detecting a code. The second method comprises the steps of extracting edges by performing the Dyadic wavelet transform to a scan image; selecting edges having a high-frequency-wave intensity higher than a specified value from the extracted edges; extracting straight lines by performing the Hough transform to the selected edges; specifying a base line among the extracted straight lines; specifying a region including straight lines of the specific direction to the base line more than a predetermined number as a candidate region; performing a pattern matching to the candidate region of the scan image, and detecting a code.

Hereafter, the Dyadic wavelet transform and the Hough transform which are used for specifying a base line will be explained simply.

[Dyadic Wavelet]

Figure 8:
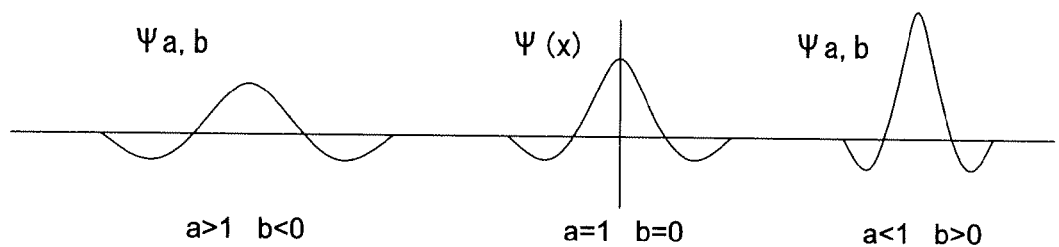
FIG. 8 is a drawing showing the wavelet transform function.

The wavelet transform is such a conversion that input signals are converted into the sum total of the wavelet function like Formula (3) by a step of obtaining the wavelet transform coefficient $\langle f, \psi_{a,b} \rangle$ with respect to input signals f(x) with Formula (2) by the use of a wavelet function (Formula (1)) which vibrates in a finite range as shown in FIG. 8.

$$\psi_{a,b}(x) = \psi\left(\frac{x-b}{a}\right) \quad (1)$$

$$\langle f, \psi_{a,b} \rangle \equiv \frac{1}{a} \int f(x) \cdot \psi\left(\frac{x-b}{a}\right) dx \quad (2)$$

$$f(x) = \sum_{a,b} \langle f, \psi_{a,b} \rangle \cdot \psi_{a,b}(x) \quad (3)$$

In the above formulas, "a" denotes the scale of the wavelet function, and "b" the position of the wavelet function. As shown in FIG. 18, as the value "a" is greater, the frequency of the wavelet function $\psi_{a,b}(x)$ is smaller. The position where the wavelet function $\psi_{a,b}(x)$ vibrates moves according to the value of position "b". Thus, Formula 3 signifies that the input signal f(x) is decomposed into the sum total of the wavelet function $\psi_{a,b}(x)$ having various scales and positions.

A great number of the wavelet functions are known, that allow the above-mentioned conversion. In the field of image processing, orthogonal wavelet and biorthogonal wavelet biorthogonal wavelet are put into common use. Orthogonal wavelet and biorthogonal wavelet functions are defined like Formula 4.

$$\psi_{i,j}(x) = 2^{-i}\psi\left(\frac{x - j \cdot 2^i}{2^i}\right) \quad (4)$$

where "i" denotes a natural number.

Comparison between Formula 4 and Formula 1 shows that the value of scale "a" is defined discretely by an i-th power of "2", according to orthogonal wavelet and biorthogonal wavelet. This value "i" is called a level.

On the other hand, the wavelet function of the Dyadic Wavelet is defined like Formula (5), (for example, Japanese Patent Unexamined Publication No. 9-212623).

$$\psi_{i,j}(x) = 2^{-i}\psi\left(\frac{x-j}{2^i}\right) \quad (5)$$

where "i" denotes a natural number.

Here, wavelet functions of orthogonal wavelet and biorthogonal wavelet are discretely defined when the minimum traveling unit of the position on level "i" is $2^i$, as described above. By contrast, in the Dyadic wavelet, the minimum traveling unit of the position is constant, despite level "i". This difference provides the Dyadic Wavelet transform with the following features:

Feature 1: The signal volume of each of high frequency band component $W_i$ and low frequency band component $S_i$ generated by the Dyadic Wavelet transform of one level shown in Formula (6) is the same as that of signal $S_{i-1}$ prior to transform.

$$S_{i-1} = \sum_j \langle S_{i-1}, \psi_{i,j} \rangle \cdot \psi_{i,j}(x) + \sum_j \langle S_{i-1}, \phi_{i,j} \rangle \cdot \phi_{i,j}(x) \quad (6)$$

$$\equiv \sum_j W_i(j) \cdot \psi_{i,j}(x) + \sum_j S_i(j) \cdot \phi_{i,j}(x)$$

Feature 2: The relationship shown with Formula (7) is found between the scaling function $\phi_{i,j}(x)$ and wavelet function $\psi_{i,j}(x)$:

$$\psi_{i,j}(x) = \frac{\partial}{\partial x}\phi_{i,j}(x) \quad (7)$$

Thus, the high frequency band component $W_i$ generated by the Dyadic Wavelet transform represents the first differential (gradient) of the low frequency band component $S_i$.

Feature 3: With respect to $W_i \cdot \gamma_i$ (hereinafter referred to as "compensated high frequency band component) obtained by multiplying the coefficient $\gamma_i$ shown in Table 2 (see the above-mentioned Reference Document on Dyadic Wavelet)) determined in response to the level "i" of the Wavelet transform, by high frequency band component, the relationship between levels of the signal intensities of compensated high frequency band components $W_i \cdot \gamma_i$ subsequent to the above-mentioned transform obeys a certain rule, in response to the singularity of the changes of input signals. To put it another way, the signal intensity of the compensated high frequency band component $W_i \cdot \gamma_i$ corresponding to smooth (differentiatable) signal changes increases with level number "i"; whereas the signal intensity of the compensated high frequency band component $W_i \cdot \gamma_i$ corresponding to stepwise signal changes stays constant independently of the level number "i", and the signal intensity of the compensated high frequency band component $W_i \cdot \gamma_i$ corresponding to functional signal changes decreases with increase in level number "i".

Feature 4: Unlike the above-mentioned method of orthogonal wavelet and biorthogonal wavelet, in the method of Dyadic Wavelet transform on level 1 in the two dimensional signals such as image signals, the low frequency band component $S_{n-1}$ is decomposed into two high frequency band components $Wx_n$, $Wy_n$ and one low frequency band component $S_n$ by the wavelet transform of level 1. Two high frequency band components correspond to components x and y of the change vector $V_n$ in the two dimensions of the low frequency band component $S_n$. The magnitude $M_n$ of the change vector $V_n$ and angle of deflection $A_n$ are given by Formulas (8) and (9)

$$Mn = (Wx^2 + Wy^2)^{\frac{1}{2}} \quad (8)$$

$$An = \alpha\tan\left(\frac{Wx}{Wy}\right) \quad (9)$$

Since the sizes of the signal strength of rectified high frequency band components $W_i, \gamma_I$ differ by the above features in accordance with the kind of information being a target of processing, it becomes possible to eliminate image information consisting of gently-sloping curves from a scanned image.

[Hough Transform]

The Hough transform is a processing to determine a straight line passing most along a feature point of an image among straight lines passing along a specific point, and as shown in Formula (10), one straight line is expressed with two parameters (the length and angle of the normal line drawn to the straight line, r and θ) by the standard Hough transform.

$$r = x \cos θ + y \sin θ \quad (10)$$

Here, if it is made θ∈[0, π] and r∈R, or θ∈[0, 2π] and r≧0, the group of (r, θ) to a certain straight line is determined in only one. In other words, a straight line is expressed such that it locates at a right angle to θ with a distance r from an original point.

Then, the Hough transformation is performed to edges extracted by the Dyadic wavelet transform, data having the few number of votes are cut among data having being subjected to the Hough transformation, thereafter, specific edges can be extracted as straight lines by a step of inverse transformation. With the assumption that data having the most number of votes is deemed as the longest straight line, a frame line, a dividing line, etc. can be specified as a base line among edges extracted by the Dyadic wavelet transform. Then, by a step of setting the direction of a pattern matching or specifying a candidate region on the basis of this base line, the pattern matching can be conducted promptly and easily.

Figure 1:
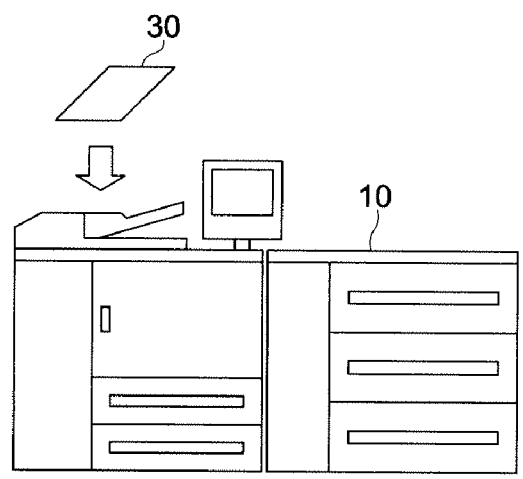
FIGS. 1(a) and 1(b) are figures showing schematically a structure of an information service system according to one example of the present invention.
Figure 1:
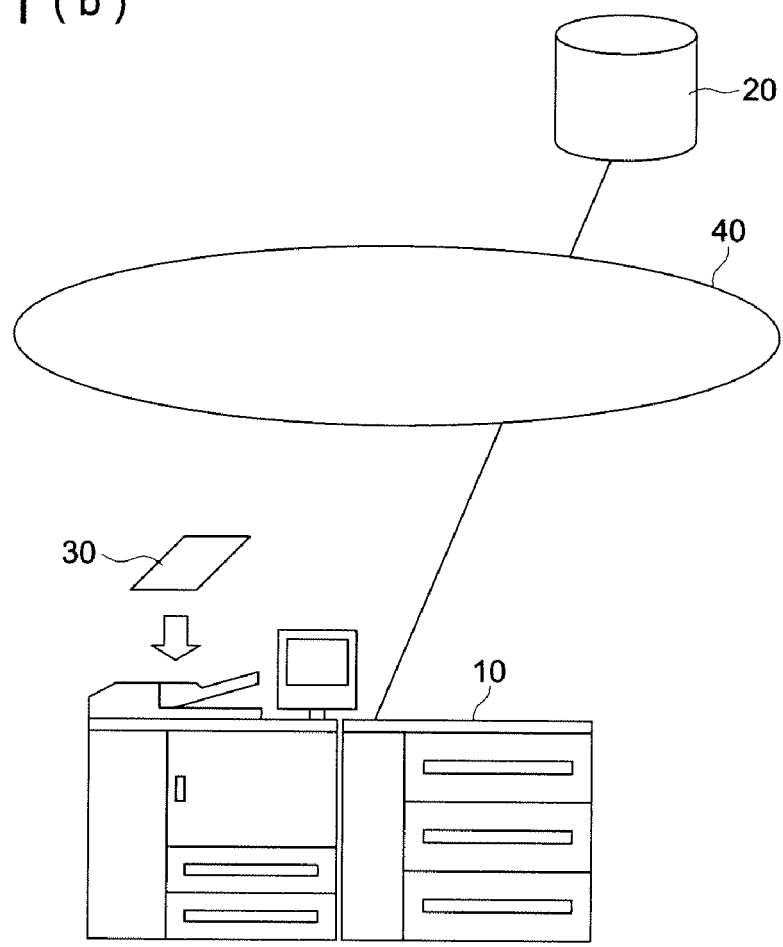
Figure 2:
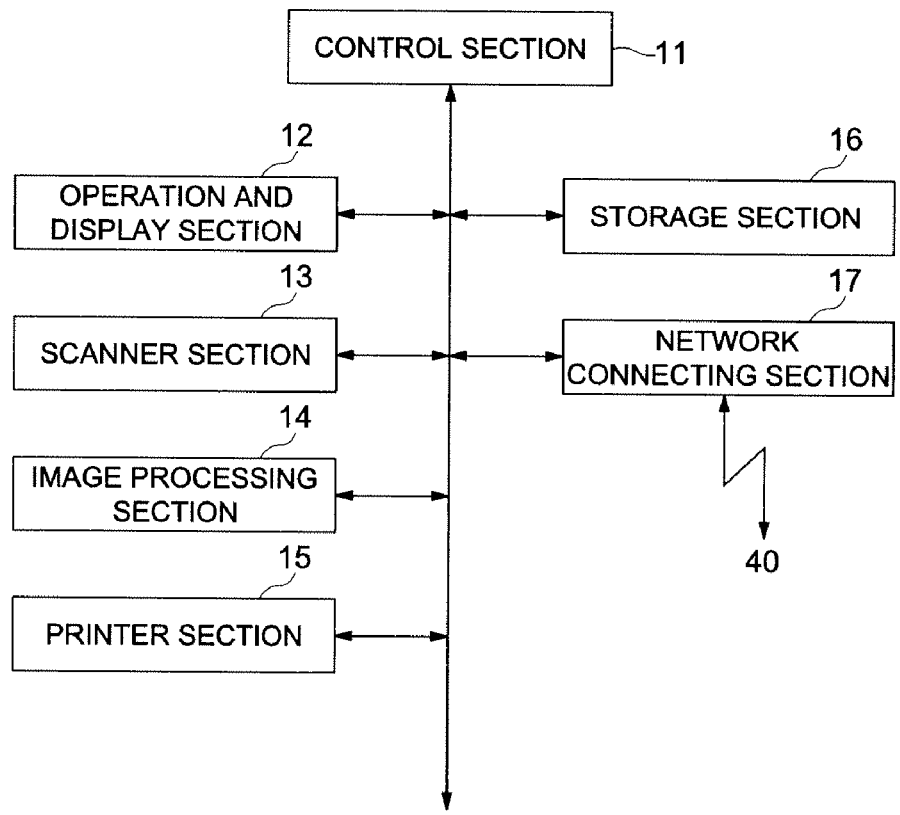
FIG. 2 is a block diagram showing a structure of an image forming apparatus according to one example of the present invention.
Figure 3:
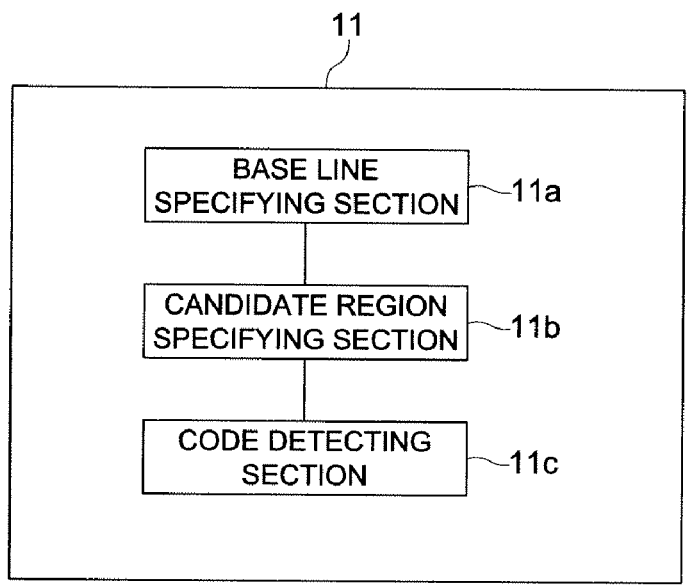
FIG. 3 is a block diagram showing a structure of a control section of the image forming apparatus in the first embodiment of the present invention.
Figure 4:
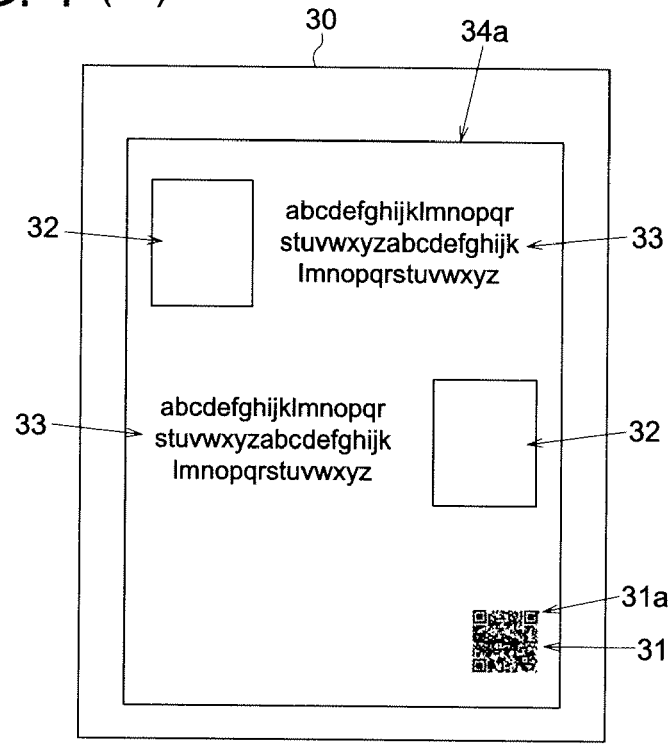
FIGS. 4(a) and 4(b) are illustrations showing a structural example of a printed matter in the first embodiment of the present invention.
Figure 4:
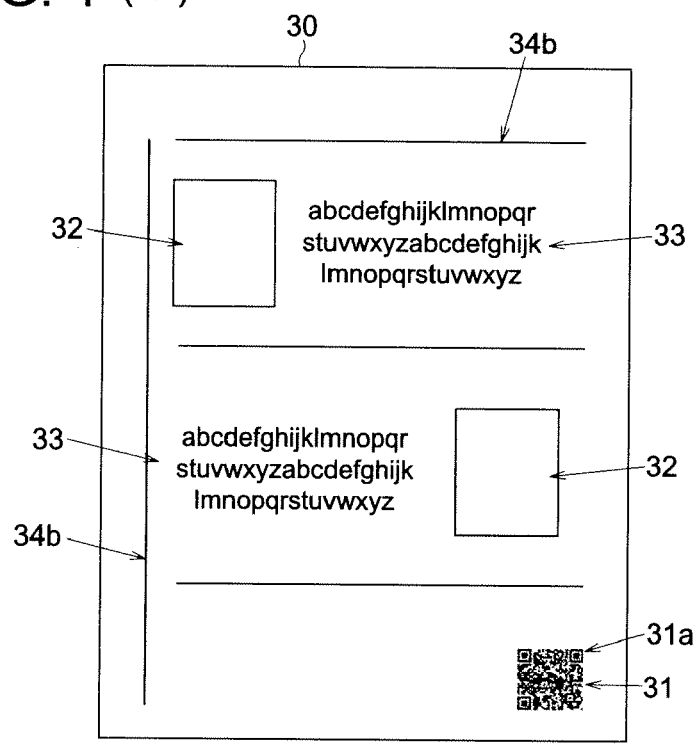
Figure 5:
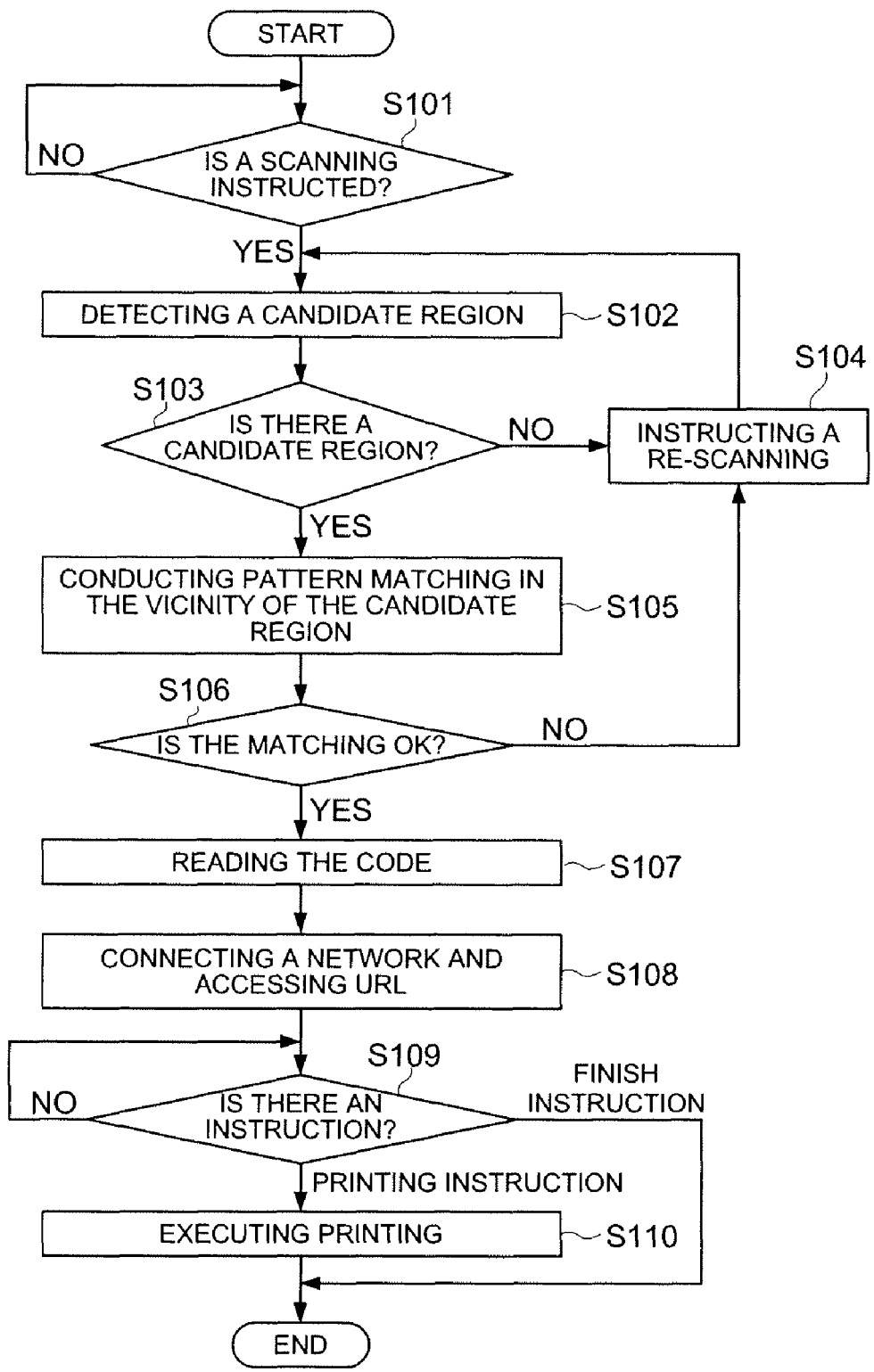
FIG. 5 is a flow chart showing an information service method employing an information service system in the first embodiment of the present invention.
Figure 6:
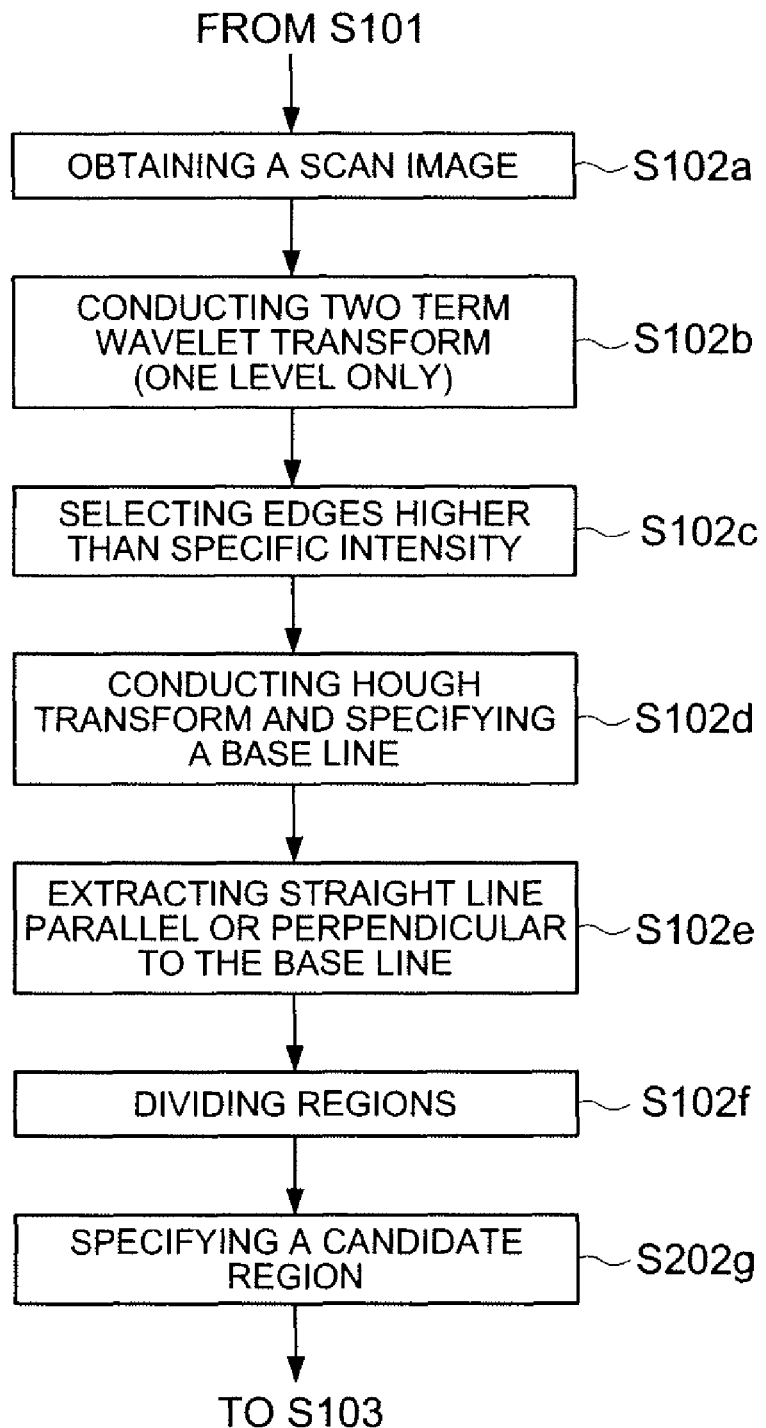
FIG. 6 is a flow chart showing a specific procedure for a candidate region in a code detecting method in the first embodiment of the present invention.
Figure 7:
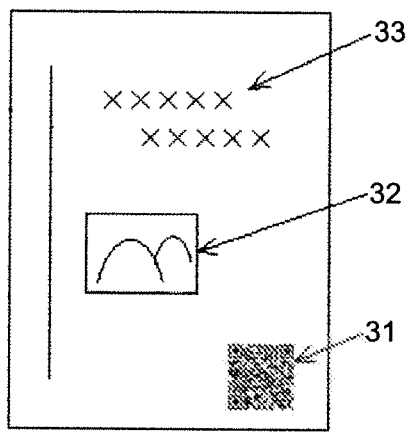
FIGS. 7(a) to 7(f) are illustrations showing a concrete example of a specific procedure for a candidate region in a code detecting method according to one example of the present invention.
Figure 7:
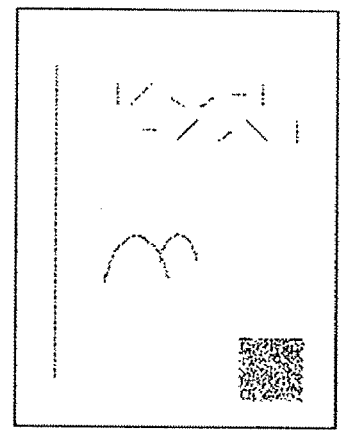
Figure 7:
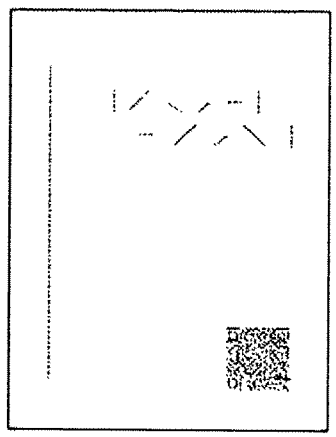
Figure 7:
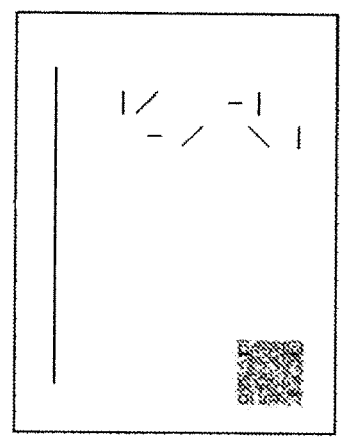
Figure 7:
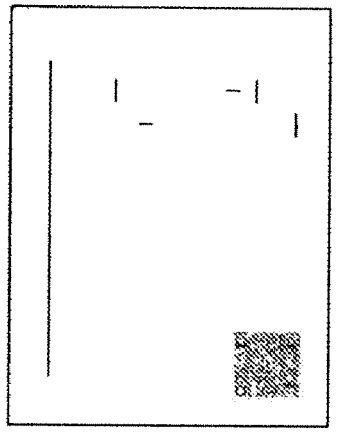
Figure 7:
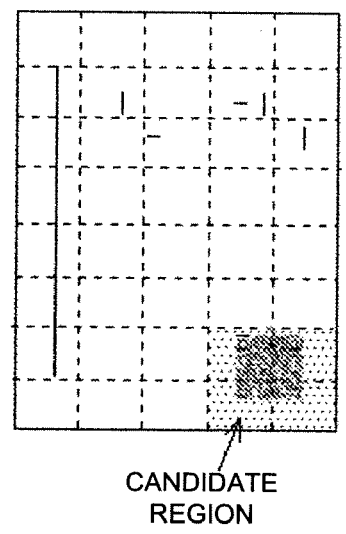

A code detecting program, a code detecting method, and an image forming apparatus according to one example of the present invention are explained with reference to FIGS. 1 to 7 in order to explain about an embodiment of the above-mentioned present invention more in detail. FIG. 1 is a drawing showing schematically a structure of an information service system of this example, FIG. 2 is a block diagram showing a structure of an image forming apparatus of this example, and FIG. 3 is a block diagram showing a structure of a control section of the image forming apparatus. Further, FIG. 4 is a drawing showing a structural example of a printed matter of this example, and FIG. 5 is a flow chart showing an information service method with the use of the information service system of this example. Moreover, FIG. 6 is a flow chart showing a procedure for specifying a candidate region in a code detecting method of this example, and FIG. 7 is a drawing showing its concrete example.

As shown in FIG. 1 (a), the information service system of this example is structured with a copy machine or a printer (hereafter, these are called an image forming apparatus 10 generically) equipped with a scanner function to detect a one-dimensional bar code, a two dimensional code, and a color two dimensional code (hereafter, these are called a code generically) printed on a printed matter 30 by scanning a printed matter 30 like a magazine or a free paper in which various information is printed on a print media, such as paper and plastics. Moreover, URL is recorded on the code, and in the case of accessing the URL to obtain information, as shown in FIG. 1 (b), the image forming apparatus 10 is connected with a server 20 storing information to be provided to a user via a communication network 40, such as WAN (Wide Area Network) and LAN (Local Area Network).

Here, there are JAN, CODE39, ITF, NW-7, CODE128, CODE93, and so on as examples of the above-mentioned one-dimensional bar code. The above-mentioned two dimensional code is classified into a stack type two dimensional code and a matrix type two dimensional code, there are PDF417, CODE49, CODE16K, and so on as examples of a stack type two dimensional code, and there are QR Code, DATA MATRIX, VERI CODE, MAXI CODE, CP CODE, CODE1, a box pattern code, ULTRA CODE, AZTECH CODE, and so on as examples of a matrix type two dimensional code. A code in the present example may be any one in which information is coded and recorded and the specification of the code is not limited specifically. Moreover, the code of this example includes a hologram etc. which records information optically.

As shown in FIG. 2, the image forming apparatus 10 of this example is equipped with a control section 11, an operation and display section 12, a scanner section 13, an image processing section 14, a printer section 15, a storage section 16, a network connecting section 17, etc., and each section is connected via a bus.

The control section 11 is constituted with a CPU (Central Processing Unit), a ROM (Read Only Memory), a RAM (Random Access Memory), etc. The CPU reads various programs memorized in the ROM by the operation of the operation and display section 12, develops it into the RAM, and controls the action of each part of the image forming apparatus 10 in accordance with the developed program.

The operation and display section 12 is provided with a pressure-sensitive type operating section (touch panel) in which transparent electrodes are arranged in the shape of a grid on a display section, such as a LCD (Liquid Crystal Display) and displays status indications of various manual operation buttons and apparatus and working situation of each function, etc. on a display section in accordance with indication signals from the control section 11. Further, the operation and display section 12 detects XY coordinate of a power point pushed with fingers, a touch pen, etc. with a voltage value, and outputs the detected position signal to the control section 11 as an operation signal. Here although the operation and display section 12 is considered as the composition with which a display section and a operating section are united in one body, an operating section in which various manual operation buttons are arranged may be provided independently from a display section.

The scanner section 13 is arranged below a glass on which a printed matter 30 is placed, and reads information recorded on the printed matter 30. The scanner section 13 is constituted by a light source which scans the printed matter 30, a CCD (Charge Coupled Devices) which converts light reflected from the printed matter 30 into electrical signals, and an A/D converter which carries out A/D conversion of the electrical signals.

The image processing section 14 performs various image processing, such as enlargement/reduction, rotation, frequency conversion, color conversion from RGB data to YMCK data onto the image (hereafter, it is called a scan image) read by the scanner section 13, and gradation correction, and outputs them to the printer section 15.

The printer section 15 is equipped with an image forming section which forms an image to be printed on a transfer sheet, a transferring section which transfers the formed image to a transfer sheet, a fixing section which fixes the transferred image, a conveying section which conveys a transfer sheet, and a cleaning section which cleans the image forming section, the transferring section, and the fixing section. The printer section 15 forms an image on a transfer sheet with an electrophotography method based on inputted data, and outputs the transfer sheet.

The storage section 16 is constituted by a flash memory, a hard disk, etc., and memorizes various data, setups, etc.

The network connecting section 17 is constituted by a NIC (Network Interface Card), a modem, a LAN adapter, a router, a TA (Terminal Adapter), etc., and performs communication control with the server 20 connected through a communication network 40.

Incidentally, FIG. 1 shows an example of the image forming apparatus 10 of this example, and the image forming apparatus 10 may have at least a function to read a printed matter 30 so as to detect a code. The image forming apparatus 10 may be made as a scanner device without a printing function, and may be made as a composite machine (MFP: Multi Function Peripheral) equipped with an automatic document feeding device (ADF: Auto Document Feeder), a post processing section (Finisher), etc.

Here, as shown in FIG. 4 (a), image information 32, such as a photograph, an illustration, a figure, and text information 33, such as a hiragana, a katakana, a kanji, an alphabet, a sign, etc., are arranged on a printed matter 30 (which may be one sheet or plural sheets bound in a booklet), such as a magazine and a free paper. Further, a specific mark is provided at a predetermined place on the printed matter 30. In the case of QR Code, the specific mark is a cutout symbol 31a arranged at the upper left, the upper right, and the lower left, and in the case of DATA MATRIX, the specific mark is an L type guide cell arranged in the left and the bottom. Hereafter, the specific mark is explained as the cutout symbol 31a. Further, a code 31 in which a pattern recording coded URL information is arranged is printed on a region specified with the cutout symbol 31a. Furthermore, a frame line 34a is printed around these in consideration of a design, easy observation, etc. Moreover, as shown in FIG. 4 (b), a dividing line 34b is printed in place of the frame line 34a or together with the frame line 34a.

Therefore, it is not easy to detect a code 31 from a printed matter 30 in which various information of these are printed. Further, since an arrangement of a code 31 is not constant, in order to detect a code 31 certainly, a pattern matching has to be performed to all the area of a scan image. Especially, when a printed matter 30 is set obliquely to the scanner section 13, a code 31 is arranged obliquely to the field angle of a scan image. For this reason, there is a problem that the pattern matching has to be performed from various angles and it will take time to detect a code 31.

Then, in this example, even in the case where a printed matter 30 in which various information is printed is scanned obliquely, in order to make it possible to detect a code 31 simply and certainly, the above-mentioned frame line 34a and the dividing line 34b are specified as a base line, and the pattern matching is performed only in the specific direction parallel or perpendicular to the base line, or a region including the predetermined number or more straight lines having the specific direction parallel or perpendicular to the base line is specified as a candidate region, and the pattern matching is performed only to the candidate region.

Concretely, as shown in FIG. 3, the control section 11 is provided with a base line specifying section 11a which specifies a base line from a scan image by using the Dyadic wavelet transform and the Hough transform mentioned above; a candidate region specifying section 11b which divides a scan image into two or more regions, and specifies a region including the predetermined number or more of straight lines having the specific direction parallel or perpendicular (hereafter, it calls merely parallel and/or perpendicular) to a based line as a candidate region from those regions; and a code detecting section 11c which detects a cutout symbol 31a by performing a pattern matching to the candidate region of the scan image, or performing a pattern matching to a scan image in the specific direction parallel or perpendicular to a base line and reads information recorded in the code 31.

Here, the above-mentioned base line specifying section 11a, the candidate region specifying section 11b, and the code detecting section 11c may be constituted as hardware, or a computer is structured as the base line specifying section 11a, the candidate region specifying section 11b and the code detecting section 11c or a code detecting program is constituted such that a computer functions as the base line specifying section 11a, the candidate region specifying section 11b and the code detecting section 11c and this code detecting program is operated on the control section 11.

Next, a procedure from reading a printed matter 30 to printing a discount ticket by the use of the image forming apparatus 10 of the above-mentioned composition is explained with reference to flow charts shown in FIGS. 5 and 6 and a schematic diagram of FIG. 7.

First, a printed matter 30 in which a code 31 is printed is set on the image forming apparatus 10, the operation and display section 12 is operated to instruct a scan at Step S101 of FIG. 5, the scanner section 13 scans the printed matter 30 with a light source, receives light reflected from the printed matter 30 by CCD and coverts the light into electrical signals, carries out A/D conversion of the electrical signals and produces a scan image in which information on the printed matter 30 is recorded. Although this scan may be conducted with any of monochrome or color, since the above-mentioned frame line 34a and the dividing line 34b are printed usually with black and the processing of a scan image with monochrome is simpler, it is more desirable to scan in monochrome, if a code 31 is not a color two dimensional code.

Next, at Step S102, the control section 11 detects a candidate region in which it is judged that a code 31 is printed. The detection procedure of this candidate region is explained in full detail with reference to FIGS. 6 and 7.

First, the control section 11 obtains a scan image from the scanner section 13 at Step S102a. As far as this scan image is an image representing brightness, an image density, and lightness data, etc., it may be not limited especially. The scan image may be an image obtained by the scanner section 13, or an image processed by the image processing section 14.

Next, at Step S102b, the base line specifying section 11a performs the Dyadic wavelet transform of only one level for the scan image, and obtains a horizontal high frequency component (Wx) and a vertical high frequency component (Wy), and calculates a high-frequency intensity (namely, the size Mn of the change vector Vn) and the degree of edge angle (namely, the deflection angle An) in accordance with the formula (8) and (9) mentioned above.

Explaining more concretely, FIG. 7(*a*) shows the composition of the scan image schematically, when the Dyadic wavelet transform is performed to this scan image, an edge will be detected, and an edge image as shown in FIG. 7(*b*) is produced. At this time, although the frame line 34*a*, the dividing line 34*b*, and the code 31 hardly change, the text information 33 becomes a short straight line group having various inclinations, and the image information 32 becomes a gently-sloping curve.

Next, at Step S102*c*, the base line specifying section 11*a* selects edges having high-frequency intensity (namely, density fluctuation) higher than a specified value among the edges obtained by the Dyadic wavelet transform. Here, the image information is a usually gently-sloping curve. Therefore, in the Dyadic wavelet transform of 1 level, since the high-frequency intensity of the gently-sloping curve becomes small as the feature of the Dyadic wavelet transform mentioned above, the image information 32 is excluded from a scan image as shown in FIG. 7(*c*).

Next, at Step S102*d*, the base line specifying section 11*a* performs the Hough transform to the edge having intensity more than a specific intensity. In this Hough transform, edges having the few number of votes are cut, thereafter, when an inverse transform is carried out so as to extract straight lines, as shown in FIG. 7(*d*), the frame line 34*a* and the dividing line 34*b* are extracted as long straight lines. On the other hand, among the edges of the text information 33 and the code 31, edges having the number of votes more than a specified value are extracted as short straight lines. And then, the frame line 34*a* and the dividing line 34*b* are specified as a base line 35 by a step of selecting the longest straight line (namely, a straight line having the largest number of votes) out of these straight lines.

Next, at Step S102*e*, the candidate region specifying section 11*b* extracts only the straight line of a specific direction (here, parallel and/or perpendicular to the base line 35) to the base line 35 specified at the above-mentioned step out of plural straight lines extracted by the Hough transform. With this processing, slant straight lines in the text information 33 are excluded, and the scan image becomes as shown in FIG. 7(*e*).

Next, at Step S102*f*, the candidate region specifying section 11*b* divides the scan image into plural regions with vertical and horizontal lines, and at Step S102*g*, the candidate region specifying section 11*b* selects a region having edges more than a predetermined number from the plural divided regions, and specifies the region as a candidate region. Concretely, as shown in FIG. 7(*f*), among the regions divided with vertical and horizontal lines, a shaded region becomes a candidate region in which straight lines parallel and/or perpendicular to the base line 35 are included more than a predetermined number. Here, since the candidate region serves as a group of some regions, a cutout symbol 31*a* is looked for at the boundary line between the group and a non-candidate region.

Next, returning to FIG. 5, at Step S103, the control section 11 judges whether the candidate region is detected from the scan image. When there is no candidate region, a user is required to investigate whether a code 31 is printed on the printed matter 30 or the printed matter 30 is set suitably for the scanner section 13. At Step S104, if the user instructs a re-scan, the processing will return to Step S102 and the same processing will be repeated.

On the other hand, when there is a candidate region, at Step S105, the code detecting section 31*c* of the control section 11 performs a pattern matching near the candidate region of the scan image by using a well-known technique, and detects a cutout symbol 31*a* by comparing the cutout symbol 31*a* with a figure which is set up beforehand. Here, in the case of DATA MATRIX, an L type guide cell may be detected, and, in the case of the code which uses other mark, the mark may be detected.

Incidentally, in the flow charts of FIGS. 5 and 6, a candidate region is specified and the pattern matching is performed to the candidate region of the scan image. However, after the base line 35 is specified at Step S102*d* in FIG. 6, the pattern matching may also be performed to the scan image in the specific direction to the base line 35 (for example, parallel and/or perpendicular to the base line 35). By performing the pattern matching only in the specific direction, the code 31 can be detected simply and quickly.

And, at Step S106, the code detecting section 31*c* judges the result of the pattern matching, when the cutout symbol 31*a* cannot be detected by the pattern matching, a user is required to investigate whether a code 31 is printed on the printed matter 30 or the printed matter 30 is set suitably for the scanner section 13. At Step S104, if the user instructs a re-scan, the processing will return to Step S102 and the same processing will be repeated.

On the other hand, when the cutout symbol 31*a* can be detected by the pattern matching, at Step S107, the code detecting section 31*c* reads the information recorded in the code 31. And, when URL information is recorded is the code 31, at Step S108, the control section 11 connects with a communication network 40 by using the network connecting section 17, accesses a server 20 specified by the URL information, and obtains the information on a discount ticket etc. from the server 20. Here, when the information of a discount ticket etc. is recorded in the code 31, the processing of Step S108 may be omitted.

And, at Step S109, the control section 11 waits a user's instruction. When the user instructs to end without printing a discount ticket (for example, when it is not a discount ticket which the user wishes to obtain), the control section 11 ends the series of processing. When the user instructs to print a discount ticket, the control section 11 transmits the information recorded on the code 31 or the information obtained from the server 20 to the printer section 15, and at Step S110, the printer section 15 performs the print of a discount ticket etc., and the control section 11 ends the processing.

Thus, the base line specifying section 11*a*, the candidate region specifying section 11*b*, and the code detecting section 11*c* are provided in the control section 11 of the image forming apparatus 10 as hardware or software, the Dyadic wavelet transform and Hough transformation are performed for a scan image obtained by a step of scanning a printed matter 30 by the scanner section 13 such that a base line 35 is specified and a region including straight lines with specific directions such as parallel or perpendicular to the base line 35 more than a predetermined number is specified as a candidate region. And then, since a pattern matching is performed for the candidate region of the scan image so as to detect a code 31, the time necessary for the pattern matching can be shortened remarkably and the code 31 can be detected simply and certainly in comparison with a conventional method of performing the pattern matching for all regions at various angles.

Moreover, the time necessary for the pattern matching can be shortened remarkably and the code 31 can be detected simply and certainly by a method of:

providing the base line specifying section 11a and the code detecting section 11c in the control section 11 of the image forming apparatus 10 as hardware or software, performing the Dyadic wavelet transform and Hough transformation for a scan image obtained by a step of scanning a printed matter 30 by the scanner section 13 so as to specify a base line 35, and conducting a pattern matching for the scan image in a specific direction such as parallel or perpendicular to the base line so as to detect a code 31.

Incidentally, the above embodiment is explained with regard to the case where a frame 34a or a dividing line 34b are provided to a printed matter 30. However, even in the case where these are not printed on a printed matter 30, when a printed matter 30 is scanned by the scanner section 13, since the edge of a sheet of the printed matter 30 can be extracted, the edge of the sheet can also be used as a base line 35.

Moreover, the above embodiment is explained with regard to the case where a code 31 printed on a printed matter 30 is detected. However, the present invention is not limited to the above-mentioned embodiment. The present invention can be similarly applied to the case where figures including components parallel and/or perpendicular to the base line 35 many are detected from a scan image in which image information 32, text information 33, etc. are intermingled.

Next, the second embodiment to attain the second object of the present invention will be explained. However, since this embodiment is one example, the present invention is not limited to this embodiment.

In the present invention, as the desirable second embodiment, an image forming apparatus equipped with a scanner function, comprises: as hardware or software, a code detecting section to detects codes, such as a one-dimensional bar code and a two dimensional code from a scan image of a scanned printed matter; a display and control section to creates a selecting screen, an enlarged screen, and a pop up screen in order to allow a user to select a desired code from the plural codes and to display these screens on a display section; and an information obtaining section to read a selected code and to obtain information recorded in the code or information stored at URL recorded on the code; and the image forming apparatus conducts processes utilizing the code, for example, displays the obtained information, prints a discount ticket based on the obtained information, stores the obtained information, or transmits the obtained information to a desired device.

Figure 9:
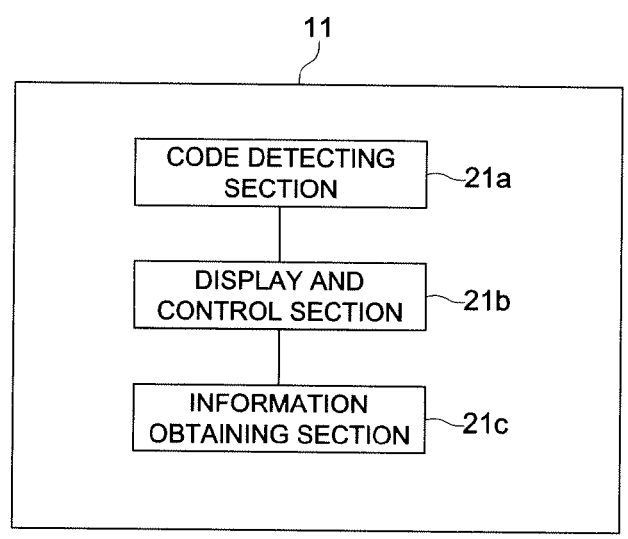
FIG. 9 is a block diagram showing a structure of a control section of an image forming apparatus in the second embodiment of the present invention.
Figure 10:
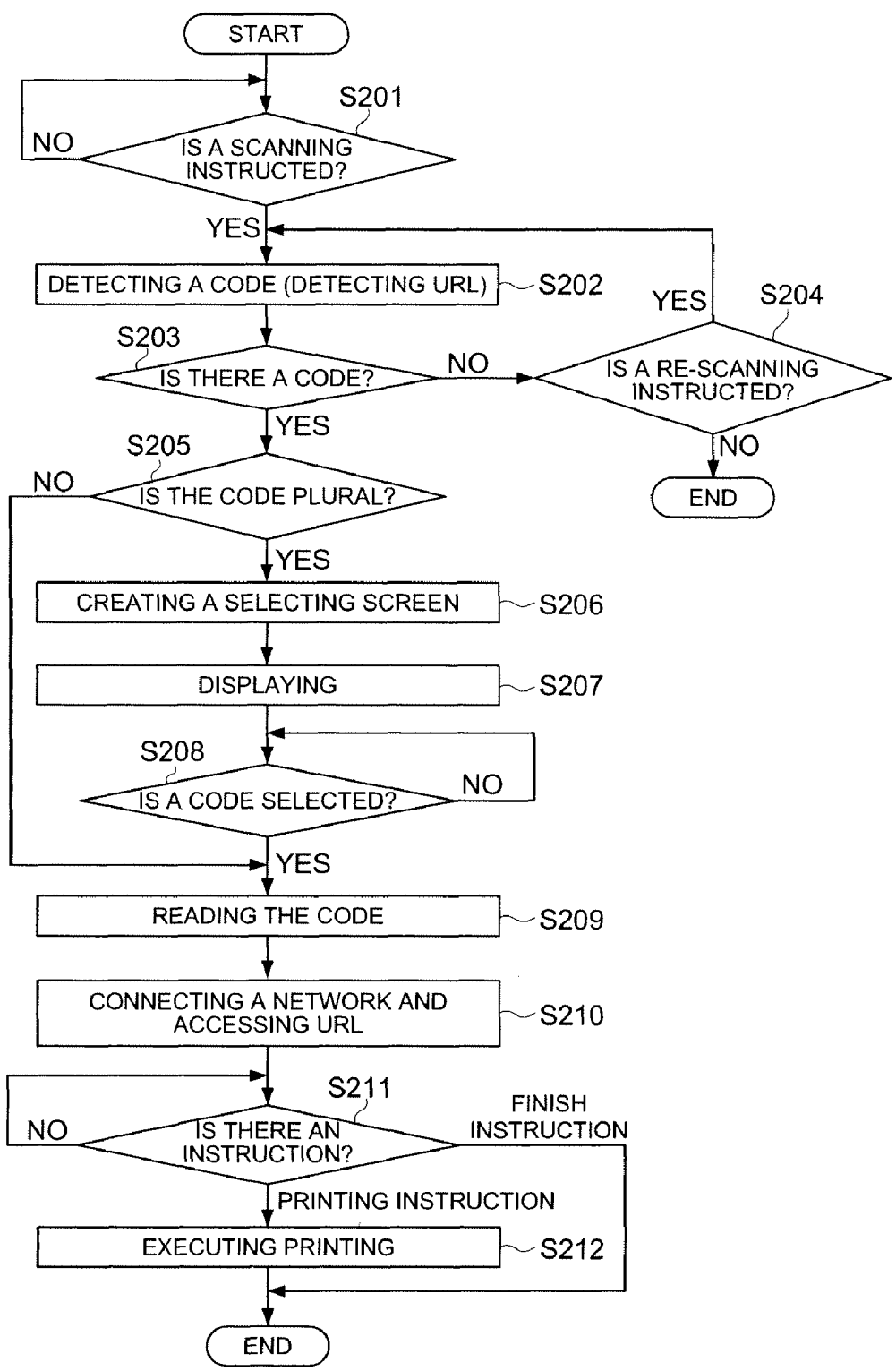
FIG. 10 is a flow chart showing a control method employing an information service system in the first example of the second embodiment of the present invention.
Figure 11:
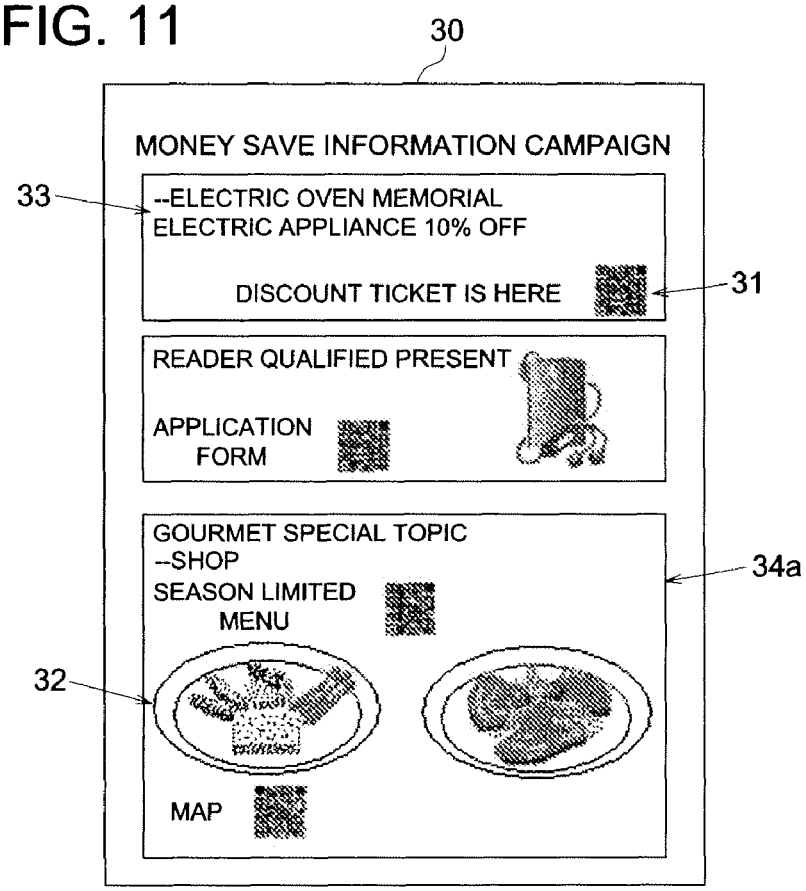
FIG. 11 is an illustration showing a structural example of a printed matter in the second embodiment of the present invention.
Figure 12:
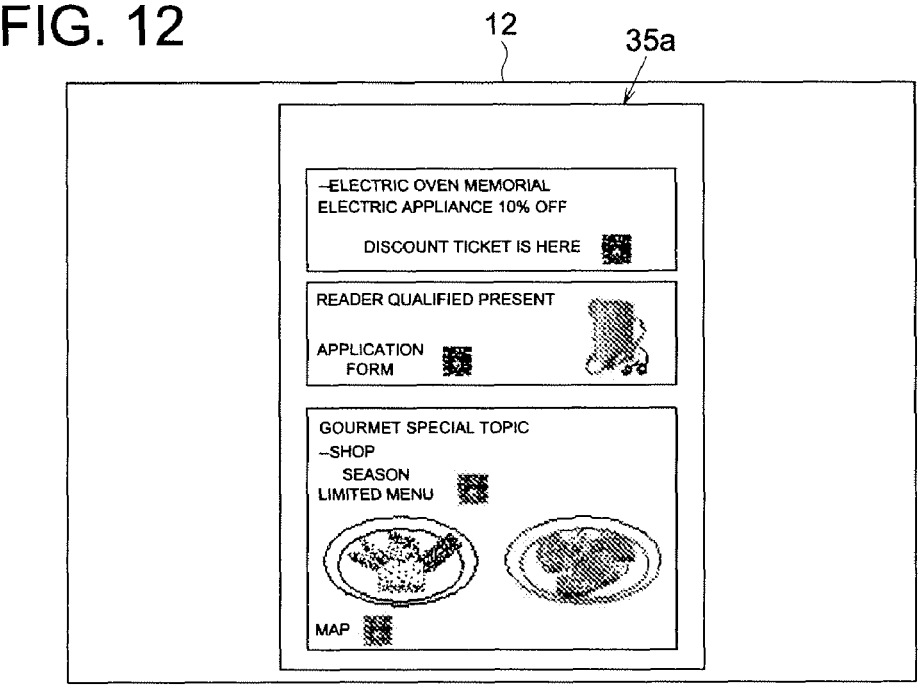
FIG. 12 is a figure showing a structural example of a screen displayed on the image forming apparatus in the first example of the second embodiment of the present invention.
Figure 13:
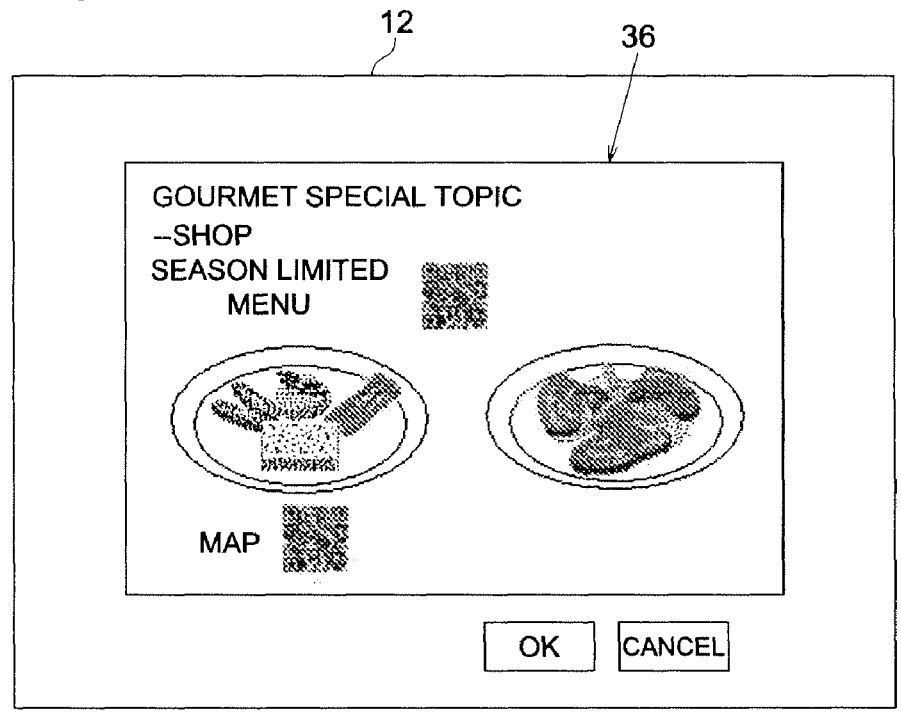
FIGS. 13(a) and 13(b) are figures showing a structural example of a screen displayed on the image forming apparatus in the first example of the second embodiment of the present invention.
Figure 13:
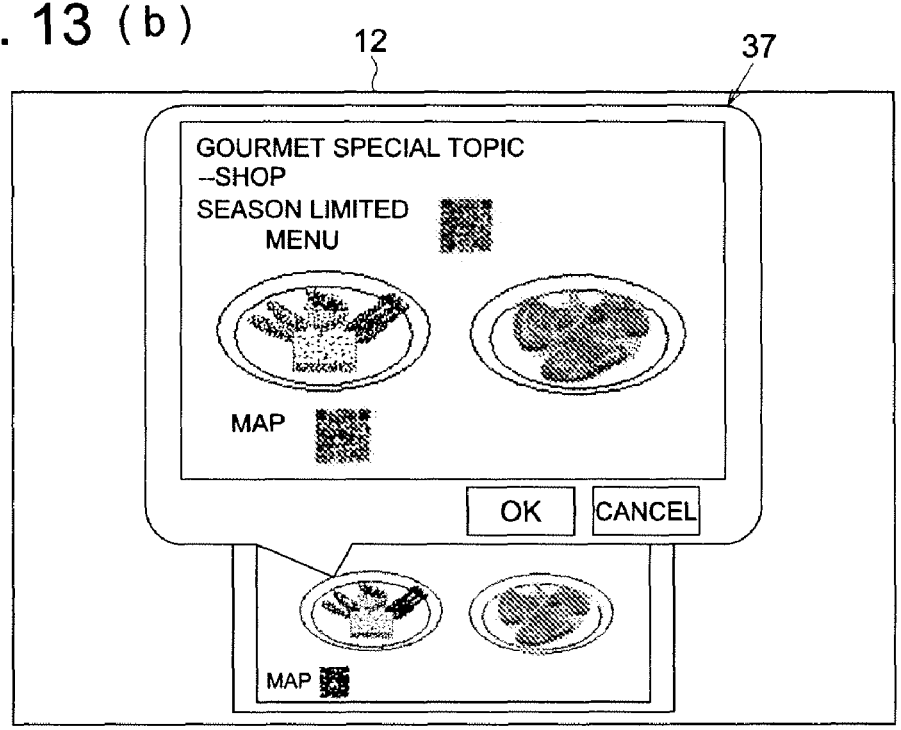
Figure 14:
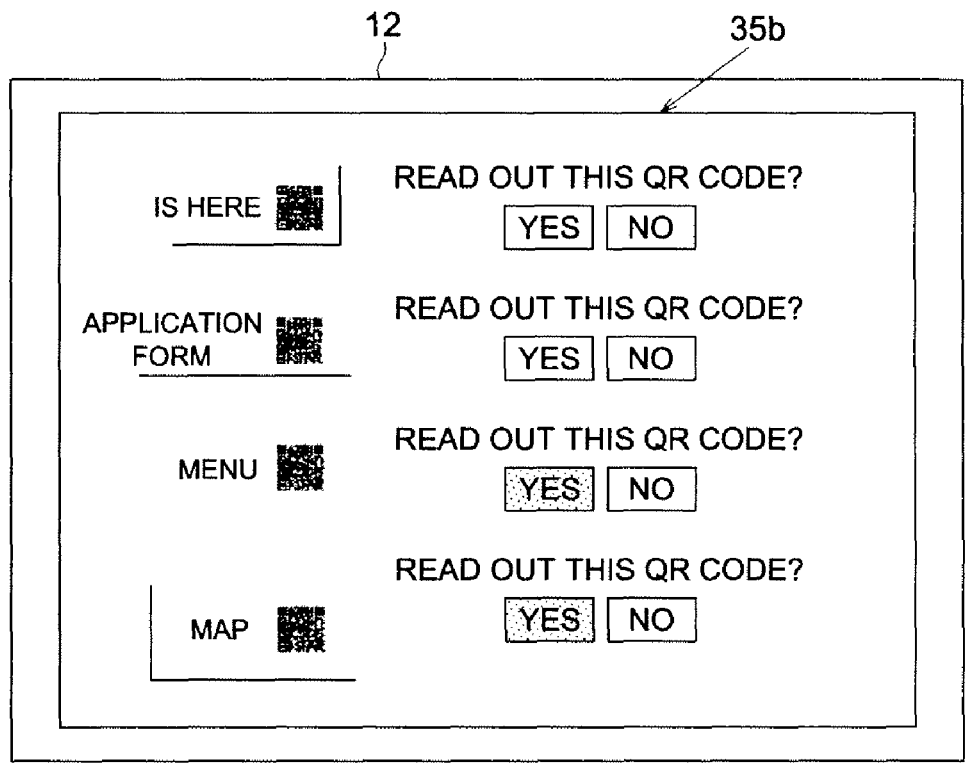
FIG. 14 is a figure showing a structural example of a screen displayed on the image forming apparatus in the first example of the second embodiment of the present invention.
Figure 15:
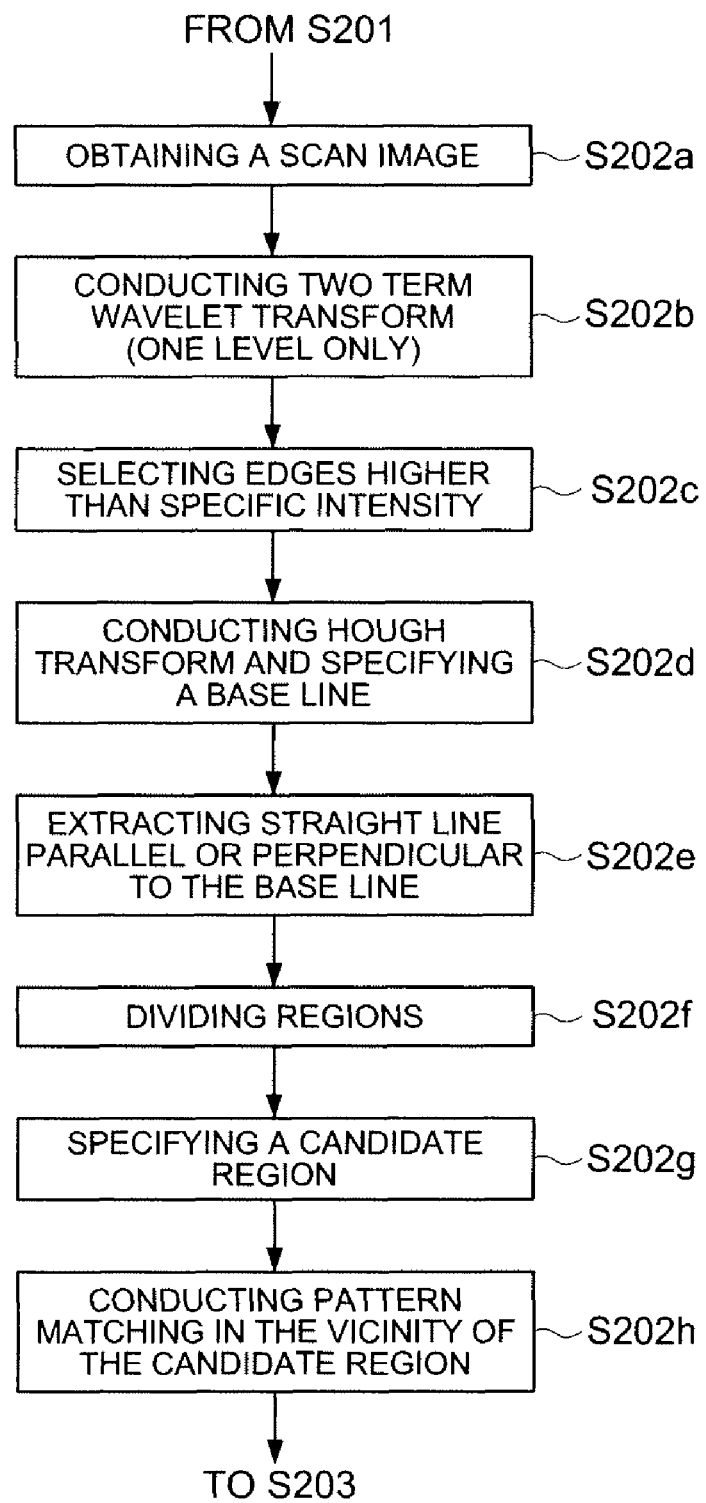
FIG. 15 is a flow chart showing a code detecting procedure in the first example of the second embodiment of the present invention.

The control program, the control method, and the image forming apparatus according to the first example of the second embodiment of the present invention are explained with reference to FIGS. 9 to 15. FIG. 9 is a block diagram showing a structure of a control section of the image forming apparatus. Further, FIG. 10 is a flow chart showing a control method employing an information service system of this example, FIG. 11 is a drawing showing a structural example of a printed matter of this example, and FIGS. 12 to 14 are figures showing structural examples of screens displayed on the image forming apparatus of this example. Moreover, FIG. 15 is a flow chart showing a code detection procedure of this example.

Here, as shown in FIG. 11, on a printed matter 30 (which may be one sheet or plural sheets bound in a booklet), such as a magazine and a free paper, a code 31 on which URL is recorded is printed together with image information 32, such as a photograph, an illustration, a figure, and text information 33, such as a hiragana, a katakana, a kanji, an alphabet, a sign, and so on. When plural codes 31 are printed on a printed matter 30, even if the printed matter 30 is read by the scanner section 13, in the image forming apparatus 10, it is difficult to judges that a processing based is to be conducted based on which one of the plural codes 31.

Then, in this embodiment, even in the case of scanning a printed matter 30 on which plural codes 31 are printed, in order to perform a processing using a desired code 31, codes 31 are detected from a scan image, when the detected code 31 is plural, the plural codes 31 are displayed so as to make it possible to select a desired code, and a processing employing the selected code 31 is made to perform.

Concretely, as shown in FIG. 9, a control section 11 is provided with a code detecting section 21a which detects plural codes 31 from a scan image, a display and control section 21b which creates a screen for allowing a user to select a desired code from the plural codes 31 and displays this screen on an operation and display section 12, and an information obtaining section 21c which reads the selected code 31 and obtains information recorded on this code 31 or information stored in a server 20 which is specified by URL recorded on this code 31.

Incidentally, the above-mentioned code detecting section 21a, the display and control section 21b, and the information obtaining section 21c may be constituted as a hardware, and also a control program may be constituted such that a computer functions as the code detecting section 21a, the display and control section 21b, and the information obtaining section 21c, and the control program is operated on the control section 11.

Hereafter, procedures from reading a printed matter 30 until printing a discount ticket by using the image forming apparatus 10 having the above-mentioned configuration is explained with reference to FIGS. 10 to 15.

First, at Step S201 of FIG. 10, a printed matter 30 in which one or plural codes 31 are printed is set in the image forming apparatus 10, and when a user operates the operation and display section 12 and instructs a scan, the scanner section 13 scans the printed matter 30 with a light source, receives light reflected from the printed matter 30, converts the light into electrical signals by CCD, conduct an A/D conversion for the electrical signals and produces a scan image in which information on the printed matter 30 is recorded. Any one of a monochrome mode or a color mode may be sufficient for this scan. However, since a processing for a scan image of a monochrome image is simpler, if a code 31 is not a color two dimensional code, it is more desirable to scan with a monochrome mode.

Next, at Step S202, the code detecting section 21a of the control section 11 detects one or plural codes 31 from a scan image. This code detecting method is not limited in particular. However, as shown in FIG. 11, usually, in consideration of a design, conspicuousness, and so on, long straight lines such as a frame line 34a showing a boundary and a dividing line are printed on a printed matter 30, such as a magazine and a free paper. Since codes 31 are printed in parallel and/or perpendicular to these straight lines, it becomes possible to detect codes 31 efficiently by utilizing these straight lines.

Now, the embodiment is explained concretely with reference to FIGS. 15 and 7. First, at Step S202a of FIG. 15, the control section 11 obtains a scan image from the scanner section 13. As far as this scan image is an image representing brightness, an image density, and lightness data, etc., it may be not limited especially. The scan image may be an image obtained by the scanner section 13, or an image processed by the image processing section 14.

Next, at Step S202b, the code detecting section 21a performs the Dyadic wavelet transform of only one level for the scan image, and obtains a horizontal high frequency component (Wx) and a vertical high frequency component (Wy), and calculates a high-frequency intensity (namely, the size Mn of the change vector Vn) and the degree of edge angle (namely, the deflection angle An) in accordance with the formula (8) and (9) mentioned above.

Explaining more concretely, FIG. 7(a) shows the composition of the scan image schematically, when the Dyadic wavelet transform is performed to this scan image, an edge will be detected, and an edge image as shown in FIG. 7(b) is produced. At this time, although the frame line 34a, the dividing line 34b, and the code 31 hardly change, the text information 33 becomes a short straight line group having various inclinations, and the image information 32 becomes a gently-sloping curve.

Next, at Step S202c, the code detecting section 21a selects edges having high-frequency intensity (namely, density fluctuation) higher than a specified value among the edges obtained by the Dyadic wavelet transform. Here, the image information is a usually gently-sloping curve. Therefore, in the Dyadic wavelet transform of 1 level, since the high-frequency intensity of the gently-sloping curve becomes small as the feature of the Dyadic wavelet transform mentioned above, the image information 32 is excluded from a scan image as shown in FIG. 7(c).

Next, at Step S202d, the code detecting section 21a performs the Hough transform to the edge having intensity more than a specific intensity. In this Hough transform, edges having the few number of votes are cut, thereafter, when an inverse transform is carried out so as to extract straight lines, as shown in FIG. 7(d), the frame line 34a and the dividing line 34b are extracted as long straight lines. On the other hand, among the edges of the text information 33 and the code 31, edges having the number of votes more than a specified value are extracted as short straight lines. And then, the frame line 34a and the dividing line 34b are specified as a base line 34 by a step of selecting the longest straight line (namely, a straight line having the largest number of votes) out of these straight lines.

Next, at Step S202e, the code detecting section 21a extracts only the straight line of a specific direction (here, parallel and/or perpendicular to the base line 34) to the base line 34 specified at the above-mentioned step out of plural straight lines extracted by the Hough transform. With this processing, slant straight lines in the text information 33 are excluded, and the scan image becomes as shown in FIG. 7(e).

Next, at Step S202f, the code detecting section 21a divides the scan image into plural regions with vertical and horizontal lines, and at Step S202g, the candidate region specifying section 21b selects a region having edges more than a predetermined number from the plural divided regions, and specifies the region as a candidate region. Concretely, as shown in FIG. 7(f), among the regions divided with vertical and horizontal lines, a shaded region becomes a candidate region in which straight lines parallel and/or perpendicular to the base line 35 are included more than a predetermined number. Here, since the candidate region serves as a group of some regions, a cutout symbol 31a is looked for at the boundary line between the group and a non-candidate region.

Next, at Step S202h, the code detecting section 21a performs a pattern matching near the candidate region of the scan image by using a well-known technique, and detects a cutout symbol 31a by comparing the cutout symbol 31a with a figure which is set up beforehand. Here, in the case of DATA MATRIX, an L type guide cell may be detected, and, in the case of the code which uses other mark, the mark may be detected.

Incidentally, in the flow charts of FIG. 15, a candidate region is specified and the pattern matching is performed to the candidate region of the scan image. However, after the base line 34 is specified at Step S202d in FIG. 15, the pattern matching may also be performed to the scan image in the specific direction to the base line 34 (for example, parallel and/or perpendicular to the base line 34). By performing the pattern matching only in the specific direction, the code 31 can be detected simply and quickly.

Further, the step of detecting the code 31 is explained with regard to the case where a frame 34a or a dividing line 34b are provided to a printed matter 30. However, even in the case where these are not printed on a printed matter 30, when a printed matter 30 is scanned by the scanner section 13, since the edge of a sheet of the printed matter 30 can be extracted, the edge of the sheet can also be used as a base line 34.

Next, returning to FIG. 10, at Step S203, the code detecting section 21a judges based on the result of the pattern matching whether or not a code 31 exists in the scan image. When a code 31 cannot be detected, a user is required to investigate whether a code 31 is printed on the printed matter 30 or the printed matter 30 is set suitably for the scanner section 13. At Step S204, if the user instructs a re-scan, the processing will return to Step S202 and the same processing will be repeated.

On the other hand, when codes 31 exist in the scan image, at Step S205, the code detecting section 21a judges whether codes 31 are plural. When the codes 31 are plural, at Step S206, the display and control section 21b creates a selecting screen for allowing a user to select a desired code 31 from the plural codes 31, and Step S207, the display and control section 21b displays the selecting screen on a touch-panel screen of the operation and display section 12.

Various configurations of this selecting screen may be considered. For example, as shown in FIG. 12, the selecting screen 35a is produced such that the whole scan image is reduced so as to be displayed in the touch-panel screen of the operation and display section 12. The positions of the codes 31 on the selecting screen 35a is memorized with the correlation in which the positions of the codes 31 are correlated with XY coordinates of the touch panel. Therefore, when one of the codes 31 is designated on the touch panel, a code 31 correlated beforehand with the designated point (for example, code 31 near the designated point) can be identified as the designated code 31.

Moreover, the screen of the operation and display section 12 of the image forming apparatus 1 is not usually so large. Therefore, if the whole scan image is displayed on the touch-panel screen, it may become difficult to read each of information. As a result, there may be problem that a user selects a wrong code 31. Then, the display and control section 21b enlarges the region near the position where the user touches on the selecting screen 35a of FIG. 12 (for example, the region in a frame line 34a), and the enlarged screen 36 as shown in FIG. 13(a) can also be displayed, by displaying such the enlarged screen 36, the wrong selection of the code 31 can be prevented and operability can be improved. Moreover, as shown in FIG. 13(b), the display and control section 21b can also display with a overlapping display mode a pop up screen 37 in which the region (for example, the region in a frame line 34a) near the position where the user touches on the selecting screen 35a is enlarged.

By displaying such a pop up screen 37, also, the wrong selection of the code 31 can be prevented and operability can be improved.

Moreover, in FIG. 12, the whole scan image is displayed on the touch-panel screen. However, when codes 31 can be identified by a step of checking text information 33 and the image information 32 around the codes 31, the display and control section 21b cuts out regions near the respective codes 31 and produces a selecting screen 35b in which the cut-our regions are arranged selectively as shown in FIG. 14. By memorizing the positions of the codes 31 or the cut-out regions on the selecting screen 35b with the correlation in which these positions are correlated with XY coordinates of the touch panel, when one of the codes 31 is designated on the touch panel, a code 31 near the designated point can be identified as the designated code 31.

Here, although a code 31 is selected by a touch on a touch-panel screen, the code 31 may be selected by the use of a mouse, a keyboard, etc. Moreover, when a scanning is conducted for a printed matter 30 on the condition where the printed matter 30 is not been arranged in a right direction, it may be also considered that the selecting screens 35a and 35b, the enlarged screen 36, and the pop up screen 37 are not displayed in the right direction. However, the above-mentioned screens can be displayed in the right direction by the judgment of top and bottom with the following techniques. First, when a code 31 is detected at Step S202, top and bottom can be judged based on arrangements of three cutout symbols 31a. Second, Specific characters (for example, character of "http://", etc.) are recognized from a scan image by the use of a well-known character recognition function (OCR function) so that top and bottom can be judged. Moreover, in the above-mentioned explanation, although a screen for allowing a user to select a code 31 is displayed, in the case where a character of "http://" is recognized, URL can also be displayed so as to be selected with a code 31 or in place of a code 31.

And, at Step S208, when one or plural codes 31 are selected on the selecting screens 35a and 35b, or when the number of codes 31 is one at Step S205, the information obtaining section 21c reads a code 31 at Step S209. And, when URL is recorded in the code 31, the information obtaining section 21c connects a communication network 40 by the use of the network connecting section 17 at Step S210, accesses a server 20 specified by the URL, and obtains information such as a discount ticket stored in the server 20. Here, when the information such as a discount ticket is recorded in the code 31, the process of Step S1210 can be omitted.

And, at Step S211, the control section 11 displays the obtained information on the operation and display section 12, and waits for a user's instruction. When ending without printing a discount ticket is instructed (For example, when the discount ticket is not one which a user wishes to have), a series of processing are ended. On the other hand, when printing a discount ticket is instructed, the information obtained from the server 20 or the information recorded in the code 31 is transmitted to the printer section 15, and at Step S212, the printer section 15 performs printing a discount ticket, then the processing is ended.

Incidentally, the above-mentioned flow is structured such that a discount ticket is printed by an image forming apparatus which scans a printed matter 30. However, it may also be structured such that it is printed by other image forming apparatus connected through a communication network 40. Moreover, it may also be structured to performs a processing other than a print. For example, the obtained information is stored at the storage section 16 of the image forming apparatus 1, or the obtained information is transmitted to a computer terminal, a personal digital assistant, etc. through a communication network 40.

Thus, the image forming apparatus 10 comprises the code detecting section 21a, the display and control section 21b, and the information obtaining section 21c as hardware or software, and detects plural codes 31 from a scan image, displays the detected plural codes 31 on the operation and display section 12 so as to allow selection, reads the selected code 31, obtains information recorded in the code 31 or information stored at URL recorded in the code 31, and conducts a control to display, print, save, and transmit the obtained information, whereby processes utilizing a desired code 31 can be performed easily.

Example 2

Figure 16:
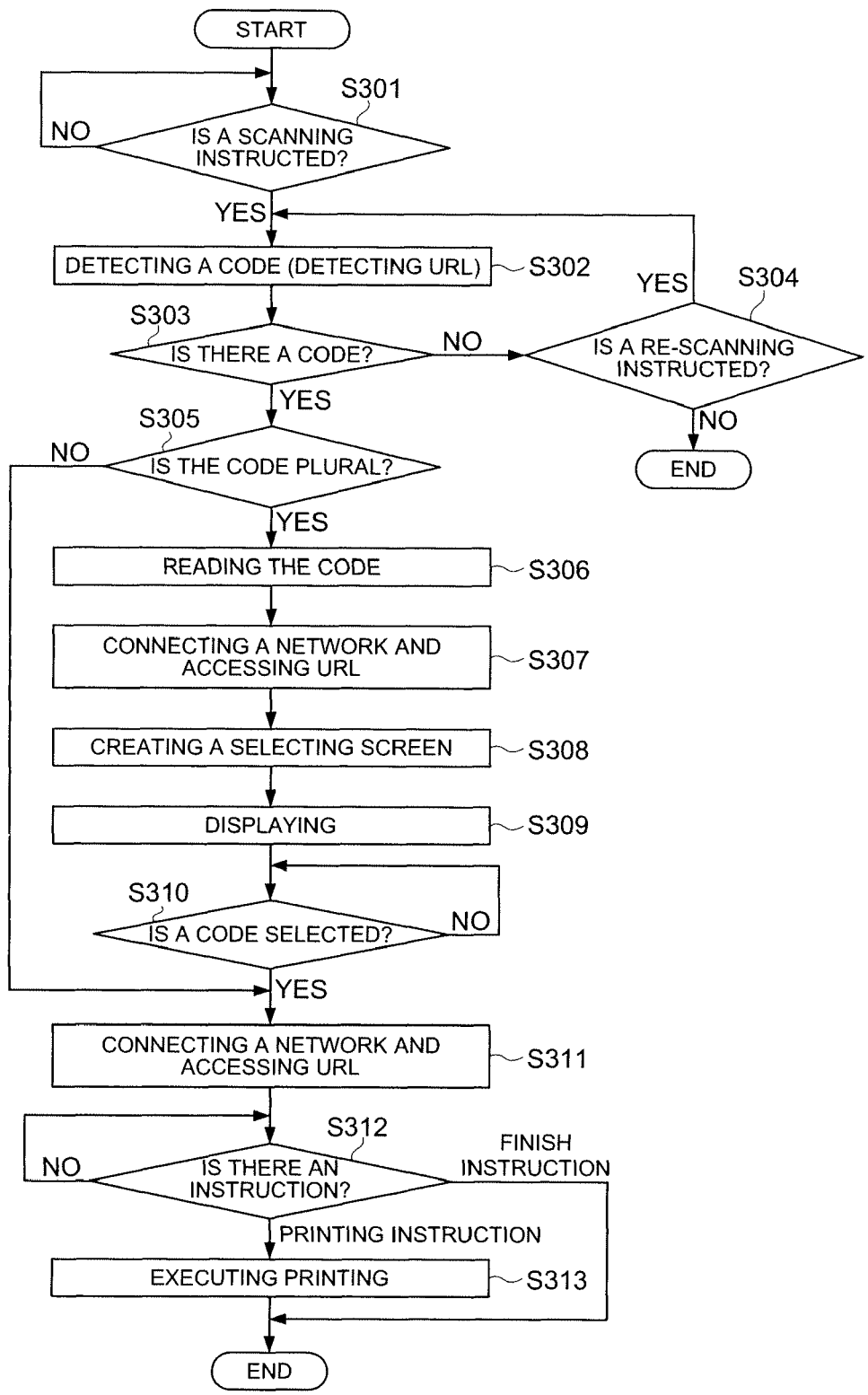
FIG. 16 is a flow chart showing a control method employing an information service system in the second example of the second embodiment of the present invention.
Figure 17:
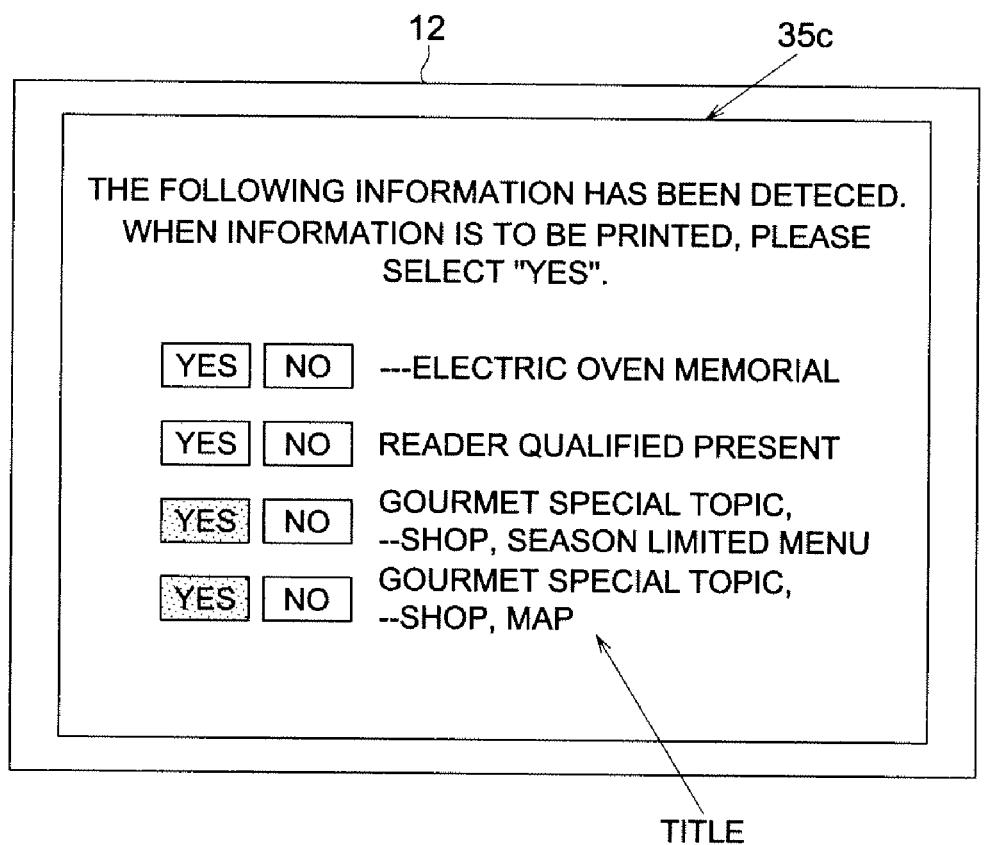
FIG. 17 is a figure showing a structural example of a screen displayed on the image forming apparatus in the second example of the second embodiment of the present invention.

Next, a control program, a control method, and an image forming apparatus according to the second example of the present invention are explained with reference to FIGS. 16 and 17. FIG. 16 is a flow chart showing a control method by the use of an information service system of this example, and FIG. 17 is a drawing showing a structural example a screen displayed on the image forming apparatus of this example.

In the above mentioned first example, after a user selects a code 31, the image forming apparatus 10 accesses a server 20. However, it may also structured such that when plural codes 31 are detected, a server 20 is accessed so as to obtain a plurality of specific information (for example, titles and so on) corresponding to each of the plural code 31, and the plurality of specific information can also be displayed on a selecting screen. By displaying such a plurality of specific information on a selecting screen, a user's selection can be made easy.

In this case, the information service system is structured such that the image forming apparatus 10 is connected through a communication network 40 with the server 20 memorizing information to be provided to a user as shown in FIG. 1 (b). Moreover, the information obtaining section 21c of the control section 11 of the image forming apparatus 10 reads the codes 31 detected by the code detecting section 21a, and obtains a plurality of specific information corresponding to all the detected codes 31 from the codes 31 or a server 20. When the codes 31 are plural, the display and control section 21b creates a screen for allowing a user to select one of the plurality of specific information obtained by the information obtaining section 21c, and controls the operation and display section 12 to displays this screen.

Hereafter, procedures from reading a printed matter 30 until printing a discount ticket by using the image forming apparatus 10 having the above-mentioned configuration is explained with reference to FIGS. 16 to 17.

As same as the first example, at Step S301, a printed matter 30 in which codes 31 are printed is set in the image forming apparatus 10, and when a user operates the operation and display section 12 and instructs a scan, the scanner section 13 scans the printed matter 30 with a light source, receives light reflected from the printed matter 30, converts the light into electrical signals by CCD, conduct an A/D conversion for the electrical signals and produces a scan image in which information on the printed matter 30 is recorded.

Next, at Step S302, the code detecting section 21a of the control section 11 detects one or plural codes 31 from a scan image. This code detecting method is not limited in particular, and codes 31 can be detected with the same method as that in the first example. Moreover, at the time of detecting a code, the top and bottom of a scan image may be judged, and URL may be detected in place of the codes 31 or together with the codes 31.

Next, at Step S303, the code detecting section 21c judges based on the result of the pattern matching whether or not a code 31 exists in the scan image. When a code 31 cannot be detected, a user is required to investigate whether a code 31 is printed on the printed matter 30 or the printed matter 30 is set suitably for the scanner section 13. At Step S304, if the user instructs a re-scan, the processing will return to Step S302 and the same processing will be repeated.

On the other hand, when codes 31 exist in the scan image, at Step S305, the code detecting section 21c judges whether codes 31 are plural. When the codes 31 are plural, at Step S306, the information obtaining section 21c reads the plural codes 31. And when URL is recorded on the codes 31, at Step S307, the information obtaining section 21c connects a communication network 40 with the use of the network connecting section 17, accesses the server 20 specified by the URL, and obtains specific information such as titles stored in the server 20. Here, when the specific information such as a title is recorded in the code 31, the process of Step S307 can be omitted. Further, the specific information is not limited to the title. The specific information may be information that can specify information corresponding to each code 31, for example, it may be a part of document or a representative picture image.

Next, at Step S308, the display and control section 21b creates a selecting screen for showing a plurality of specific information such as titles in order to allow a user to select a desired code 31 from the plural codes 31, and Step S309, the display and control section 21b displays the created selecting screen on a touch-panel screen of the operation and display section 12. The structure of this selecting screen is not limited in particular. For example, as shown in FIG. 17, the titles corresponding to each of the plural codes 31 are displayed buttons to select respective titles are arranged on the selecting screen 35c, whereby a desired title can be selected by a touch on a touch-panel screen or operation with a mouse and a keyboard.

And, at Step S310, when one or plural titles are selected on the selecting screens 35c, or when the number of codes 31 is one at Step S305, the information obtaining section 21c connects a communication network 40 by the use of the network connecting section 17 at Step 311, accesses a server 20 specified by the URL recorded in the code 31 corresponding to the selected title, and obtains all information corresponding to the code 31 (for example, information of a discount ticket) from the server 20. Here, when the information such as a discount ticket is recorded in the code 31, the process of Step S311 can be omitted. Further, at Step S307, all information corresponding to each of plural codes 31 may be obtained, in this case, the process of Step S311 can be omitted also.

And, at Step S312, the control section 11 displays the obtained information on the operation and display section 12, and waits for a user's instruction. When ending without printing a discount ticket is instructed (For example, when the discount ticket is not one which a user wishes to have), a series of processing are ended. On the other hand, when printing a discount ticket is instructed, the information obtained from the server 20 or the information recorded in the code 31 is transmitted to the printer section 15, and at Step S312, the printer section 15 performs printing a discount ticket, then the processing is ended.

Incidentally, the above-mentioned flow is structured such that a discount ticket is printed by an image forming apparatus which scans a printed matter 30. However, it may also be structured such that it is printed by other image forming apparatus connected through a communication network 40. Moreover, it may also be structured to performs a processing other than a print. For example, the obtained information is stored at the storage section 16 of the image forming apparatus 1, or the obtained information is transmitted to a computer terminal, a personal digital assistant, etc. through a communication network 40.

Thus, the image forming apparatus 10 comprises the code detecting section 21a, the display and control section 21b, and the information obtaining section 21c as hardware or software, and detects plural codes 31 from a scan image, obtains a plurality of specific information recorded on the detected plural codes 31 or a plurality of specific information stored at URL recorded on the detected plural codes 31, displays a selecting screen 35c for allowing a user to select one of the plurality of specific information on the operation and display section 12, reads the code 31 corresponding to the selected specific information, obtains information recorded in the code 31 or information stored at URL recorded in the code 31, and conducts a control to display, print, save, and transmit the obtained information, whereby processes utilizing a desired code 31 can be performed easily.

Incidentally, in each of the above-mentioned examples, the case where a code 31 and URL are detected from a printed matter 30 is explained. However, the present invention is not limited to the above-mentioned examples, and the present invention can be similarly applied to the case where arbitrary marks, signs, and characters to make it possible to acquire information to be provided to a user utilizing a printed matter 30 are detected.

As described above, in the first embodiment of the present invention, a code detecting program of the present invention makes a computer to function as:

a base line specifying section to extract edges from a scan image obtained by a scanning on a printed matter in which at least a one-dimensional bar code or a two dimensional code are printed, to extract a straight line from the extracted edges, and to specify the longest straight line as a base line among the extracted straight lines; and a code detecting section to perform a pattern matching for the scan image in a specific direction to the base line, and to detect the one-dimensional bar code or the two dimensional code.

Moreover, a code detecting program of the present invention makes a computer to function as:

a base line specifying section to extract edges from a scan image obtained by a scanning on a printed matter in which at least a one-dimensional bar code or a two dimensional code are printed, and to extracts a straight line from the extracted edges and specifies the longest straight line as a base line among the extracted straight lines;

a candidate region specifying section to specify a region containing straight lines of specific direction to the base line more than a predetermined number as a candidate region among regions divided in the scan image; and a code detecting section to perform a pattern matching to the candidate region of the scan image, and to detect the one-dimensional bar code or the two dimensional code.

In the present invention, the above specific direction can be made into a direction almost parallel and/or perpendicular to the base line.

Moreover, in the present invention, the base line specifying section is structured to perform the Dyadic wavelet transform of one level for the scan image so as to extract edges; selects edges having a high-frequency-wave intensity higher than a specified value from the extracted edges; performs the Hough transform on the selected edges so as to extract straight lines;

and specifies a straight line with the largest number of votes of the Hough transform as the base line from the extracted straight lines.

Moreover, in the present invention, a code detecting method of detecting a one-dimensional bar code or a two dimensional code printed on a printed matter, comprises:

a step of scanning the printed matter and obtaining a scan image;

a step of extracting straight lines from the extracted edges, a step of specifying the longest straight line as a base line among the extracted straight lines; and a step of performing a pattern matching to the scan image in a specific direction to the base line and extracting the one-dimensional bar code or the two dimensional code.

Moreover, in the present invention, a code detecting method of detecting a one-dimensional bar code or a two dimensional code printed on a printed matter, comprises:

a step of scanning the printed matter and obtaining a scan image;

a step of extracting edges from the scan image;

a step of extracting straight lines from the extracted edges;

a step of specifying the longest straight line as a base line among the extracted straight lines;

a step of dividing the scan image into plural regions;

a step of specifying a region containing straight line of a specific direction to the base line more than a predetermined number as a candidate region among the regions; and a step of performing a pattern matching to the candidate region of the scan image and extracting the one-dimensional bar code or the two dimensional code.

In the present invention, the step of extracting the edges performs the Dyadic wavelet transform of one level to the scan image, and extracts edges, the step of extracting the straight line selects edges having a high-frequency-wave intensity higher than a specified value from the extracted edges, performs the Hough transform on the selected edges, and extracts straight lines, and the step of specifying the base line specifies a straight line having the largest number of votes of the Hough transform as the base line among the extracted straight lines.

Moreover, in the present invention, an image forming apparatus equipped with at least a scanner section, comprises:

a base line specifying section to extract edges from a scan image obtained by a scanning for a printed matter in which at least a one-dimensional bar code or a two dimensional code is printed, to extracts straight lines from the extracted edges, and to specify the longest straight line as a base line among the extracted straight lines; and a code detecting section to perform a pattern matching to the scan image in a specific direction to the base line and to detect the one-dimensional bar code or the two dimensional code.

Moreover, in the present invention, an image forming apparatus equipped with at least a scanner section, comprises:

a base line specifying section to extract edges from a scan image obtained by a scanning for a printed matter in which at least a one-dimensional bar code or a two dimensional code is printed, to extracts straight lines from the extracted edges, and to specify the longest straight line as a base line among the extracted straight lines;

a candidate region specifying section to specify a region containing straight lines of specific direction to the base line more than a predetermined number as a candidate region among regions divided in the scan image; and a code detecting section to performs a pattern matching to the candidate region of the scan image, and to detect the one-dimensional bar code or the two dimensional code.

Thus, in the present invention, a pattern matching is performed in the specific direction to a base line, or a pattern matching is performed to a candidate region including straight lines of a specific direction to the base line more than a predetermined number, whereby a one-dimensional bar code and a two dimensional code can be detected simply and certainly from a printed matter.

In the second embodiment of the present invention, a control program of the present invention makes a computer to function as:

a code detecting section to detect plural codes from a scan image obtained by scanning a printed matter;

a display and control section to display the plural codes on a display section make it possible to select one of the plural codes, and an information obtaining section to read a selected code and to obtain information recorded on the code, or information stored at URL recorded on the code.

In the present invention, the display and control section displays the scan image on the display section and correlates each of the plural codes with the coordinate of a screen of the display section, whereby the information obtaining section identifies a selected code based on the coordinate of the position designated on the screen.

Moreover, the present invention is structured such that when a designation is conducted on the above-mentioned screen, the display and control section changes a screen image and displays an enlarged image in which a region near the designated position is enlarged, or display the enlarged image on the scan image with an overlapping display mode.

Moreover, the present invention is structured such that the display and control section cuts off regions containing respective codes from the scan image, displays the cut-off regions on the display section, and correlates each code with the coordinate of the screen of the display section, whereby the information obtaining section identifies a selected code based on the coordinate of the position designated on the screen.

Moreover, in the present invention, a control method of controlling processing based on a code printed on a printed matter; at least comprises:

an image obtaining step of obtaining a scan image by scanning the printed matter;

a code detecting step of detecting plural codes from the scan image;

a displaying step of displaying the plural codes on a display section so as to allow to elect one of the plural codes;

an information obtaining step of reading a selected code and obtaining information recorded in the code or information stored at URL recorded on the code; and an output step of outputting the obtained information.

Moreover, in the present invention, an image forming apparatus equipped with at least a scanner section, comprises:

a code detecting section to detect plural codes from a scan image obtained by a scanning for a printed matter;

a display and control section to display the plural codes on a display section so as to allow to elect one of the plural codes;

an information obtaining section to read a selected code and to obtain information recorded in the code or information stored at URL recorded on the code; and an output section to output the obtained information.

Thus, with the above-mentioned structures of the present invention, even if plural codes are printed on a printed matter, a processing utilizing a desired code can be performed easily.

According to a control program, a control method, and image forming apparatus of the present invention, even if plural codes are printed on a printed matter, a processing utilizing a desired code can be performed easily.

Because, an image forming apparatus equipped with at least a scanner section, conducts a control in such a way; detects plural codes such as a one-dimensional bar code and a two dimensional code from a scan image of a printed matter; display the plural codes on a display section so as to allow to elect one of the plural codes; read a selected code on the screen; obtains information recorded in the code or information stored at URL recorded on the code; and outputs the obtained information.

The present invention can be used for a program, a method, and an image forming apparatus which detect codes such as a one-dimensional bar code and a two dimensional code from a printed matter.

What is claimed is:

1. A medium storing a program to make a computer function as a code detecting device, the code detecting device comprising:
   a base line specifying section to extract edges from a scan image obtained by a process of scanning a printed matter in which at least a one-dimensional bar code or a two dimensional code are printed, to extract straight lines from the extracted edges, and to specify the longest straight line as a base line among the extracted straight lines; and
   a code detecting section to perform a pattern matching for the scan image based on the base line and to detect the one-dimensional bar code or the two dimensional code,
   wherein the base line is at least one of a frame line, a dividing line, and an edge of a sheet.

2. The medium described in claim 1, wherein the code detecting section performs the pattern matching for the scan image in a specific direction to the base line, and detects the one-dimensional bar code or the two dimensional code.

3. The medium described in claim 2, wherein the specific direction is almost parallel or perpendicular to the base line.

4. The medium described in claim 1, wherein the code detecting device further comprises:
   a candidate region specifying section to divide the scan image into plural regions, and to specify a region containing straight lines of a specific direction to the base line more than a predetermined number as a candidate region among the plural regions;
   wherein the code detecting section performs the pattern matching for the candidate region of the scan image, and detects the one-dimensional bar code or the two dimensional code.

5. The medium described in claim 1, wherein the base line specifying section performs Dyadic wavelet transform with one level for the scan image so as to extract edges; selects edges having a high frequency wave intensity higher than a predetermined value from the extracted edges; performs Hough transform on the selected edges so as to extract straight lines; and specifies a straight line with the largest number of votes of the Hough transform as the base line from the extracted straight lines.

6. The medium described in claim 1, wherein the code detecting section detects plural codes from the scan image, and the code detecting device further comprises:
   a display and control section to display the plural codes on a display section to make it possible to select at least one of the plural codes, and
   an information obtaining section to read a selected code, and to obtain information recorded on the code, or information stored at URL recorded on the code.

7. The medium described in claim 6, wherein the display and control section displays the scan image on the display section and correlates each of the plural codes with the coordinate of a screen of the display section, and the information obtaining section identifies the selected code based on the coordinate of a position designated on the screen.

8. The medium described in claim 6, wherein when a position is designated on a screen, the display and control section changes a screen image and displays an enlarged image in which a region near the designated position is enlarged.

9. The medium described in claim 6, wherein when a position is designated on a screen, the display and control section displays an enlarged image of a region near the designated position on the scan image with an overlapping display mode.

10. The medium described in claim 6, wherein the display and control section cuts off regions containing respective codes from the scan image, displays the cut-off regions on the display section, and correlates each code with the coordinate of a screen of the display section, and the information obtaining section identifies a selected code based on the coordinate of a position designated on the screen.

11. An image forming apparatus, comprising:
    a scanner to scan a printed matter in which at least a one-dimensional bar code or a two dimensional code are printed, and to obtain a scan image of the printed matter;
    a base line specifying section to extract edges from the scan image, to extract straight lines from the extracted edges, and to specify the longest straight line as a base line among the extracted straight lines; and
    a code detecting section to perform a pattern matching for the scan image based on the base line and to detect the one-dimensional bar code or the two dimensional code,
    wherein the base line is at least one of a frame line, a dividing line, and an edge of a sheet.

12. The image forming apparatus described in claim 11, wherein the code detecting section performs the pattern matching for the scan image in a specific direction to the base line, and detects the one-dimensional bar code or the two dimensional code.

13. The image forming apparatus described in claim 12, wherein the specific direction is almost parallel or perpendicular to the base line.

14. The image forming apparatus described in claim 11, further comprising:
    a candidate region specifying section to divide the scan image into plural regions, and to specify a region containing straight lines of a specific direction to the base line more than a predetermined number as a candidate region among the plural regions;
    wherein the code detecting section performs the pattern matching for the candidate region of the scan image, and detects the one-dimensional bar code or the two dimensional code.

15. The image forming apparatus described in claim 11, wherein the base line specifying section performs Dyadic wavelet transform with one level for the scan image so as to extract edges; selects edges having a high frequency wave intensity higher than a predetermined value from the extracted edges; performs Hough transform on the selected edges so as to extract straight lines; and specifies a straight line with the largest number of votes of the Hough transform as the base line from the extracted straight lines.

16. The image forming apparatus described in claim 11, wherein the code detecting section detects plural codes from the scan image, and the image forming apparatus further comprises:

a display and control section to display the plural codes on a display section to make it possible to select at least one of the plural codes, and an information obtaining section to read a selected code, and to obtain information recorded on the code, or information stored at URL recorded on the code.

17. The image forming apparatus described in claim 16, wherein the display and control section displays the scan image on the display section and correlates each of the plural codes with the coordinate of a screen of the display section, and the information obtaining section identifies the selected code based on the coordinate of a position designated on the screen.

18. The image forming apparatus described in claim 16, wherein when a position is designated on a screen, the display and control section changes a screen image and displays an enlarged image in which a region near the designated position is enlarged.

19. The image forming apparatus described in claim 16, wherein when a position is designated on a screen, the display and control section displays an enlarged image of a region near the designated position on the scan image with an overlapping display mode.

20. The image forming apparatus described in claim 16, wherein the display and control section cuts off regions containing respective codes from the scan image, displays the cut-off regions on the display section, and correlates each code with the coordinate of a screen of the display section, and the information obtaining section identifies a selected code based on the coordinate of a position designated on the screen.

21. A medium storing a program to make a computer to function as a code detecting device, the code detecting device comprising:

a base line specifying section to extract edges from a scan image obtained by a process of scanning a printed matter in which at least a one-dimensional bar code or a two dimensional code are printed, to extract straight lines from the extracted edges, and to specify the longest straight line as a base line among the extracted straight lines; and a code detecting section to perform a pattern matching for the scan image based on the base line and to detect the one-dimensional bar code or the two dimensional code, wherein the base line is a boundary line of a printed region including the one-dimensional bar code or the two dimensional code.

22. A medium storing a program to make a computer to function as a code detecting device, the code detecting device comprising:

a base line specifying section to extract edges from a scan image obtained by a process of scanning a printed matter in which at least a one-dimensional bar code or a two dimensional code are printed, to extract straight lines from the extracted edges, and to specify the longest straight line as a base line among the extracted straight lines; and a code detecting section to perform a pattern matching for the scan image based on the base line and to detect the one-dimensional bar code or the two dimensional code, wherein the base line is an image other than the one-dimensional bar code and the two dimensional code.

23. An image forming apparatus, comprising:

a scanner to scan a printed matter in which at least a one-dimensional bar code or a two dimensional code are printed, and to obtain a scan image of the printed matter;

a base line specifying section to extract edges from the scan image, to extract straight lines from the extracted edges, and to specify the longest straight line as a base line among the extracted straight lines; and a code detecting section to perform a pattern matching for the scan image based on the base line and to detect the one-dimensional bar code or the two dimensional code, wherein the base line is a boundary line of a printed region including the one-dimensional bar code or the two dimensional code.

24. An image forming apparatus, comprising:

a scanner to scan a printed matter in which at least a one-dimensional bar code or a two dimensional code are printed, and to obtain a scan image of the printed matter;

a base line specifying section to extract edges from the scan image, to extract straight lines from the extracted edges, and to specify the longest straight line as a base line among the extracted straight lines; and a code detecting section to perform a pattern matching for the scan image based on the base line and to detect the one-dimensional bar code or the two dimensional code, wherein the base line is an image other than the one-dimensional bar code and the two dimensional code.

* * * * *